(12) United States Patent
de Jong

(10) Patent No.: US 10,146,014 B2
(45) Date of Patent: Dec. 4, 2018

(54) FIBER OPTIC ASSEMBLY AND METHOD INCLUDING PIN SECTION(S) FOR RETAINING FIBER OPTIC CONNECTOR

(71) Applicant: Corning Optical Communications LLC, Hickory, NC (US)

(72) Inventor: Michael de Jong, Colleyville, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/430,810

(22) Filed: Feb. 13, 2017

(65) Prior Publication Data

US 2018/0210154 A1     Jul. 26, 2018

Related U.S. Application Data

(60) Provisional application No. 62/449,286, filed on Jan. 23, 2017.

(51) Int. Cl.
*G02B 6/38* (2006.01)

(52) U.S. Cl.
CPC ........... *G02B 6/3879* (2013.01); *G02B 6/389* (2013.01); *G02B 6/3825* (2013.01); *G02B 6/3849* (2013.01); *G02B 6/3893* (2013.01); *G02B 6/3895* (2013.01)

(58) Field of Classification Search
None
See application file for complete search history.

(56) References Cited

U.S. PATENT DOCUMENTS

| | | | |
|---|---|---|---|
| 5,222,168 A * | 6/1993 | Saito | G02B 6/3825 156/158 |
| 5,748,821 A | 5/1998 | Schempp et al. | |
| 8,718,436 B2 | 5/2014 | Barnes et al. | |
| 2005/0084215 A1* | 4/2005 | Grzegorzewska | G02B 6/3869 385/60 |
| 2006/0204200 A1 | 9/2006 | Lampert et al. | |
| 2011/0317976 A1 | 12/2011 | Eckstein et al. | |
| 2013/0259429 A1* | 10/2013 | Czosnowski | G02B 6/3885 385/78 |
| 2014/0016902 A1 | 1/2014 | Pepe et al. | |
| 2014/0334778 A1 | 11/2014 | Walker et al. | |
| 2015/0346436 A1 | 12/2015 | Pepe et al. | |

(Continued)

FOREIGN PATENT DOCUMENTS

WO     2015017170 A1     2/2015

OTHER PUBLICATIONS

International Search Report and Written Opinion PCT/US2018/013161 dated Apr. 17, 2018.

(Continued)

*Primary Examiner* — Michelle R Connelly
(74) *Attorney, Agent, or Firm* — Adam R. Weeks

(57) ABSTRACT

Fiber optic assemblies and related fabrication methods include a retaining member having at least one pin section that is configured to extend through an opening defined in at least one side wall of a body structure, to permit the at least one pin section to cooperate with at least one feature of a fiber optic connector received in a cavity of the body structure to thereby retain the fiber optic connector in the cavity. Exemplary body structures include dust caps, adapters, patch panels, fiber optic modules, and the like.

29 Claims, 14 Drawing Sheets

(56) References Cited

U.S. PATENT DOCUMENTS

2016/0018606 A1 1/2016 Xue et al.
2016/0178855 A1 6/2016 Tseng
2016/0349459 A1* 12/2016 Collier ................. G02B 6/3849

OTHER PUBLICATIONS

Senko Group: Advanced Components. "Secure-SC: Locking Connector" Senko, www.senko.com, 2 Pgs, No Date.

* cited by examiner

FIBER OPTIC ASSEMBLY AND METHOD INCLUDING PIN SECTION(S) FOR RETAINING FIBER OPTIC CONNECTOR

PRIORITY

This application claims the benefit of priority of U.S. Provisional Application Ser. No. 62/449,286, filed on Jan. 23, 2017, which is incorporated by reference herein in its entirety.

BACKGROUND

This disclosure relates generally to optical fibers, and more particularly to fiber optic assemblies for retaining fiber optic connectors in cavity-defining body structures, and methods for retaining fiber optic connectors in cavity-defining body structures of fiber optic assemblies.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors ("connectors") are often provided on the ends of fiber optic cables. Connectors are designed to engage adapters or other receptacles that align the connectors with other connectors or equipment so that data can be transmitted between the components.

Some connectors include one or more latch arms that extend outwardly from (e.g., in a slanted direction relative to) a connector body. Each latch arm is designed to engage an adapter in a manner that retains the connector in the adapter. Typically the latch arm must flex toward the connector body to fully insert the connector into the adapter. Once the connector is fully inserted into the adapter, the latch arm is able to flex back away from the connector body to result in the engagement mentioned above. The connector cannot then be removed from the adapter unless the latch arm is flexed toward the connector body again. Flexure of the latch arm causes a cantilever latch associated with the latch arm to rotate through a large arc between its latched and unlatched position, with such rotation causing a latching surface of the cantilever latch to be displaced in a longitudinal direction (e.g., away from a tip of the connector).

Several existing connector designs incorporate features to prevent inadvertent removal of a connector from an adapter. In particular, several connector designs incorporate features to prevent a latch arm of a connector from being moved toward the connector body. The features prevent movement of the latch arm itself or a trigger element ("trigger") that is otherwise configured to depress the latch arm. In essence, the latch arm or trigger is effectively "locked" to help prevent the connector from disengaging the adapter. The locking is typically reversible in that the latch arm or trigger can typically be "unlocked", i.e. placed back into a state that allows the latch arm to be depressed by the trigger or activated directly.

Presence of dust and other debris within a connector may compromise the integrity of fiber optic connections. Although dust caps are frequently used to prevent ingress of dust and debris into connectors, it may be difficult to positively secure dust caps on connectors that include latch arms. This is because the latch arms typically engage the dust caps in a manner similar to the manner in which the latch arms engage an adapter, thereby retaining the dust caps on the connectors. As such, the dust caps need to accommodate the flexure of the latch arms, which also means accommodating the longitudinal displacement of the associated cantilever latch mentioned above. Unfortunately, the presence of longitudinal clearance in a dust cap opens a path for dust to enter a connector. Such longitudinal clearance also permits a dust cap to wobble slightly relative to a fiber optic connector, which may cause field personnel to exhibit reduced confidence in the cleanliness of the fiber optic connector.

It may also be difficult to determine whether a dust cap has been subject to removal and reinstallation—whether due to tampering or inadvertent action. When field personnel suspect that fiber optic connectors may have been exposed to dust or debris, such personnel may be compelled to spend time inspecting and/or cleaning fiber optic connectors before placing them in service. It may also be difficult to prevent inadvertent removal of, or tampering with, connectors and adjacent mating structures such as a patch panels or modules.

Thus, although fiber optic assemblies with locking features may exist, there remains room for improvement, to address one or more of the issues outlined above.

SUMMARY

This disclosure relates generally to fiber optic assemblies and related fabrication methods that permit at least one fiber optic connector to be retained within at least one cavity of a body structure (or, stated differently, that permit a body structure to be retained on at least one fiber optic connector), using a retaining member that includes at least one pin section. Exemplary body structures include dust caps, adapters, patch panels, modules, or other structures. The at least one pin section is configured to extend through an opening (e.g., a slot, a hole, or another form of gap or aperture) defined in at least one side wall of the body structure, to permit the at least one pin section to cooperate with at least one feature of the at least one fiber optic connector in order to retain the at least one fiber optic connector within the at least one cavity of the body structure. When a body structure is embodied in a dust cap (optionally supplemented with at least one gasket), use of a retaining member including a pin section extending through an opening defined in at least one side wall of the dust cap may reduce or eliminate ingress of debris into a front end of a connector. Additionally, or alternatively, use of a retaining member including a pin section extending through an opening defined in at least one side wall of a body structure may prevent inadvertent removal of and/or tampering with connectors, relative to adjacent mating structures such as patch panels or modules. Absence of a retaining member where one was previously in place may also provide a visual indication of potential tampering.

In exemplary aspects, a fiber optic assembly for at least one fiber optic connector includes a body structure and a retaining member including at least one pin section. The body structure includes a top wall, a bottom wall, and a plurality of side walls defining at least one cavity configured to receive a portion of the at least one fiber optic connector. At least one side wall defines an opening configured to receive the at least one pin section. The at least one pin section is configured to extend through the opening defined in the at least one side wall and into the at least one cavity. Such arrangement permits the at least one pin section to cooperate with at least one feature of the at least one fiber optic connector when the at least one fiber optic connector is received by the at least one cavity to thereby retain the at least one fiber optic connector within the at least one cavity. Retaining members of various configurations including (but not limited to) continuous wire clips and molded members may be provided.

In other exemplary aspects, a fiber optic assembly includes at least one fiber optic connector configured to receive at least one optical fiber, a body structure defining at least one cavity in which a front portion of the at least one fiber optic connector is received, and a retaining member including at least one pin section. The at least one fiber optic connector includes a ferrule (which defines a front end of the at least one fiber optic connector) configured to support the at least one optical fiber; a connector body surrounding at least a portion of the ferrule; and a latch arm extending outwardly and rearwardly from a portion of the connector body, wherein an end of the latch arm can be depressed toward the connector body. The body structure includes a top wall, a bottom wall, and a plurality of side walls defining at least one cavity in which a front portion of the at least one fiber optic connector is received. A first side wall of the plurality of side walls defines a first opening and a second side wall of the plurality of side walls defines a second opening. The retaining member is configured to engage the body structure such that the at least one pin section extends (i) through the first opening, (ii) between at least a portion of the latch arm and the connector body, and (iii) through the second opening.

In other exemplary aspects, methods for forming a fiber optic assembly are provided. One step includes inserting at least one fiber optic connector into at least one cavity of a body structure. The at least one cavity is defined by a top wall, a bottom wall, and a plurality of side walls of the body structure, and at least one side wall of the plurality of side walls defines an opening. Another step includes inserting at least one pin section of a retaining member into the opening of each side wall of the plurality of side walls. Such insertion causes the at least one pin section to extend through the opening and into the at least one cavity. As a result, the at least one pin section cooperates with at least one feature of the at least one fiber optic connector to retain the at least one fiber optic connector within the at least one cavity. Optionally, the retaining member may include an intermediate segment that comprises an eccentric feature, and the method may include rotating the at least one pin section to cause the eccentric feature of the intermediate segment to exert a biasing force that urges the at least one fiber optic connector further forward within the at least one cavity of the body structure.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
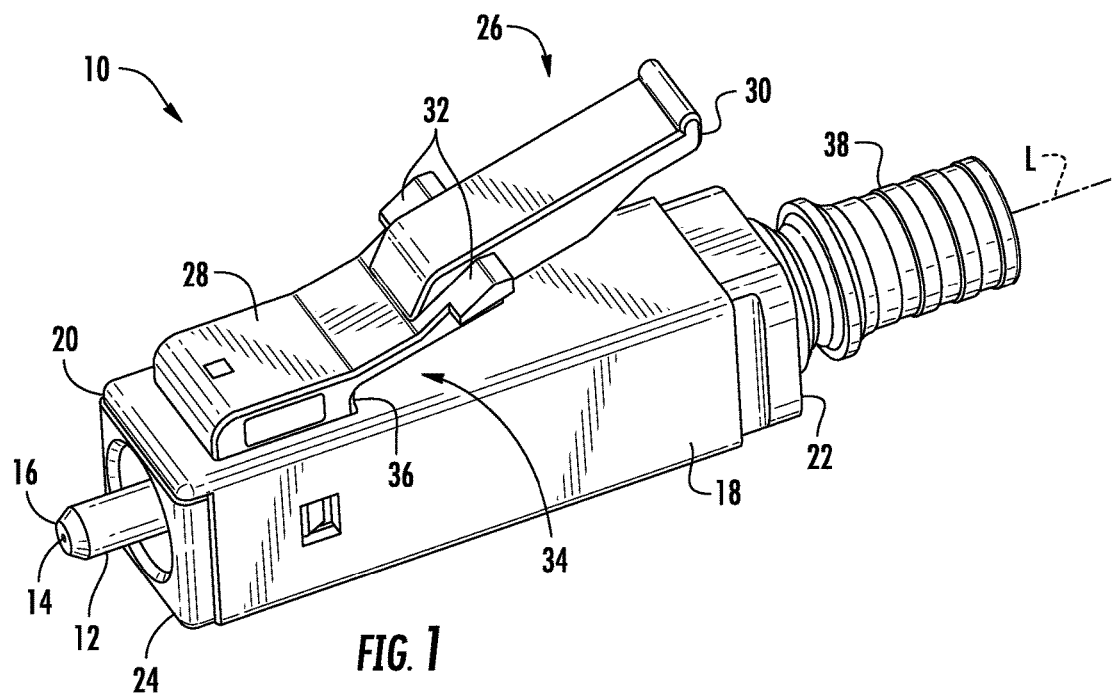
FIG. 1 is a perspective view of a simplex fiber optic connector including a ferrule configured to support a single optical fiber and being suitable for use with fiber optic assemblies and methods as disclosed herein.
Figure 2:
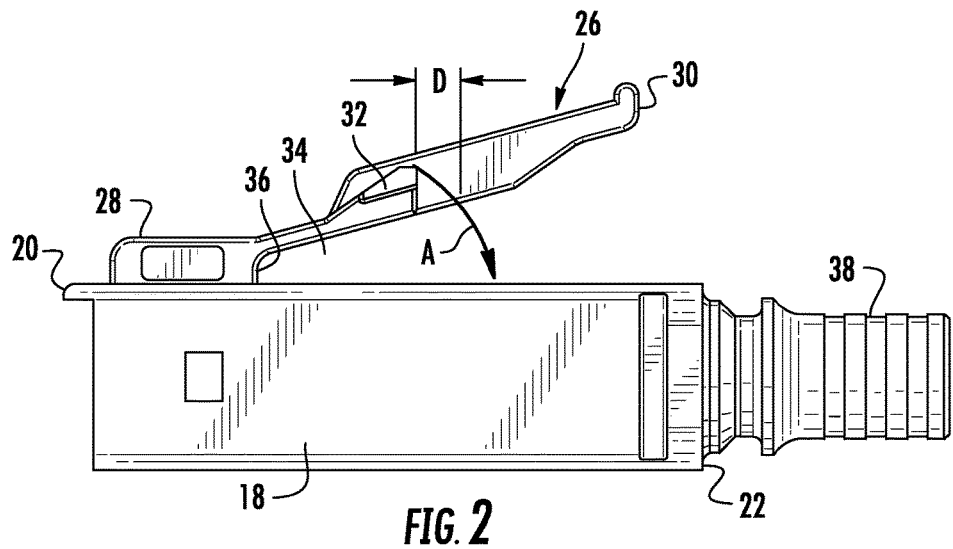
FIG. 2 is a side elevation view of a connector body of the simplex fiber optic connector illustrated in FIG. 1, with a superimposed curved arrow showing an arc of travel and corresponding superimposed vertical lines showing longitudinal displacement, respectively, of a cantilever latch tab associated with a latch arm when the latch arm is flexed between first and second positions.
Figure 3:
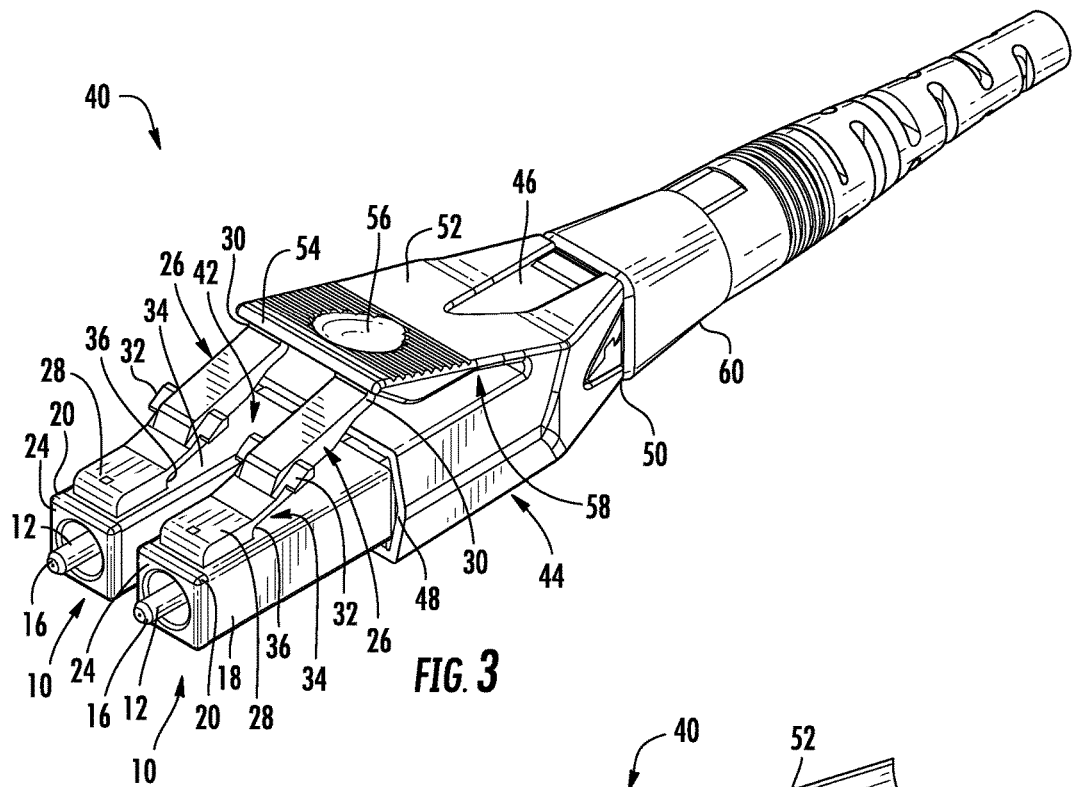
FIG. 3 is a perspective view of a duplex fiber optic connector that includes two connectors (connector elements) according to FIG. 1 as sub-assemblies thereof with the duplex fiber optic connector being suitable for use with fiber optic assemblies and methods as disclosed herein.
Figure 4:
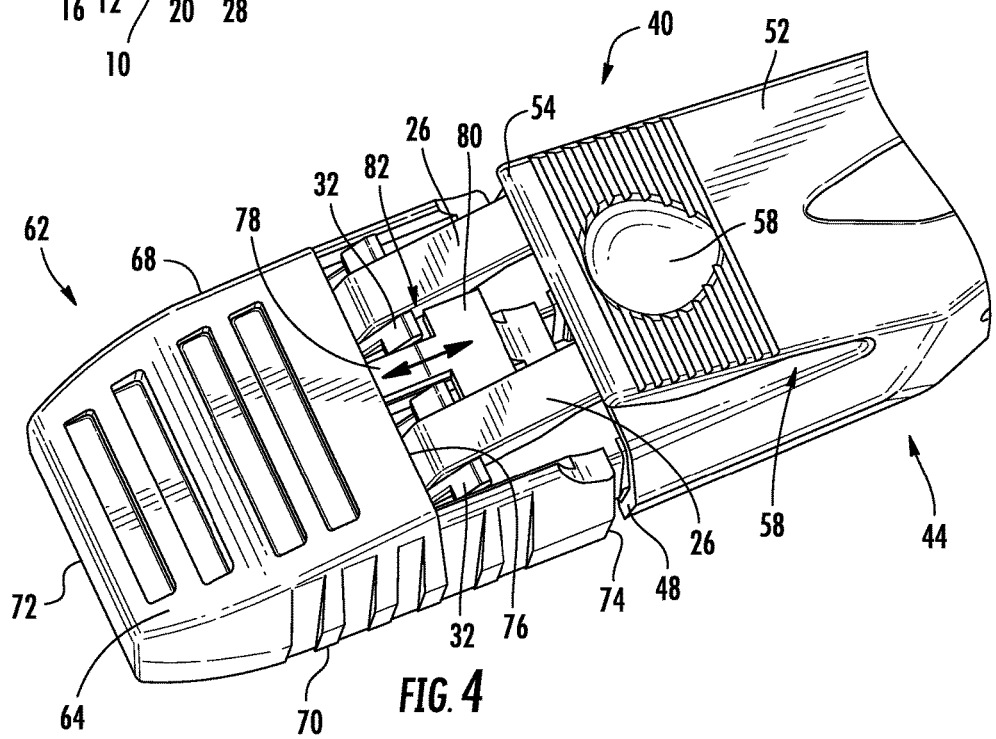
FIG. 4 is a perspective view of the duplex fiber optic connector of FIG. 3 following addition of a conventional dust cap over a front end of the duplex fiber optic connector, with a superimposed double-ended arrow showing a direction of longitudinal float of the dust cap relative to the duplex fiber optic connector.

Various embodiments will be further clarified by examples in the description below. In general, the description relates to fiber optic assemblies and related fabrication methods that permit at least one fiber optic connector to be retained within at least one cavity of a body structure, using a retaining member that includes at least one pin section. Exemplary body structures include dust caps, adapters, patch panels, fiber optic modules, and other structures. The at least one pin section is configured to extend through an opening (e.g., a hole, a slot, or another form of gap or aperture) defined in at least one side wall of the body structure, to permit the at least one pin section to cooperate with at least one feature of the at least one fiber optic connector in order to retain the at least one fiber optic connector within the at least one cavity of the body structure. A first example of a fiber optic connector 10 (also referred to as "optical connector 10", or simply "connector 10") is shown in FIGS. 1 and 2. The connector 10 is shown in the form of a simplex LC connector. A second example of a fiber optic connector 40 (also referred to as "optical connector 40", or simply "connector 40") is shown in FIGS. 3 and 4. The connector 40 is shown in the form of a duplex LC connector.

Before discussing fiber optic assembly embodiments and associated fabrication methods, a brief overview of the connector 10 and the connector 40 will be provided to facilitate discussion, as various components shown in subsequent figures may be used in connection with the same or similar types of connectors as the connectors 10, 40. However, persons skilled in the field of optical connectivity will appreciate that the connectors 10, 40 are merely examples, and that the general principles disclosed with respect to other components shown in subsequent figures may also be applicable to other connector designs.

As shown in FIG. 1, the connector 10 includes a ferrule 12 configured to support an optical fiber (not shown) extending in a generally longitudinal direction L through a bore 14 of the ferrule 12. An intermediate portion of the ferrule 12 extends through a cap 24 coupled to a connector body 18 (also referred to as a "connector sub-assembly housing 18," "connector housing 18," or simply "housing 18"). The ferrule 12 extends from a ferrule holder (not shown) that is retained within the connector body 18 by the cap 24. A spring (not shown) biases the ferrule holder forward within the connector body 18 so that a front end 16 of the ferrule 12 projects forward beyond a front end 20 of the connector body 18. The front end 16 of the ferrule 12 presents the optical fiber extending through the bore 14 for optical coupling with a mating component (e.g., another fiber optic connector).

The connector 10 further includes a latch arm 26 extending outwardly and rearwardly from (e.g., in a slanted direction relative to) a portion of the connector body 18. In this regard, the latch arm 26 has a proximal end 28 coupled to the connector body 18 and a distal end 30 spaced from the connector body 18, with the connector body 18 and the latch arm 26 being separated from one another and defining a space 34 therebetween. A proximal or forward end of the space 34, which embodies a generally triangular shape when viewed from the side, is bounded by a limit surface 36. An intermediate portion of the latch arm 26 includes cantilever latch tabs 32, which protrude laterally from the latch arm 26 but not to an extent that would exceed a width of the connector body 18 when viewed from above (although that may not be the case in alternative embodiments). The distal end 30 of the latch arm 26 may be depressed toward the connector body 18 to disengage the connector 10 from another structure, such as an adapter or a dust cap (neither shown in FIG. 1).

FIG. 2 shows the connector body 18 illustrated in FIG. 1, with a superimposed curved arrow A showing an arc of travel and corresponding superimposed vertical lines showing longitudinal displacement D, respectively, one of the cantilever latch tabs 32 associated with the latch arm 26 when the latch arm 26 is flexed between a first (e.g., upward or relaxed) position as shown and a second (e.g., downward or depressed) position (not shown). As shown, when the latch arm 26 is depressed downward toward the connector body 18, the cantilever latch tab 32 tends to move in an arcuate path according to the curved arrow A, and such arcuate path causes the cantilever latch tab 32 to move rearward in a distance equal to the longitudinal displacement D, away from the front (or proximal) end 20 of the connector body 18. Body structures (e.g., adapters or dust caps) designed to cooperate with the latch arm 26 to retain the connector 10 in the body structure should accommodate such longitudinal clearance to permit the latch arm 26 to be operated; however, the presence of such longitudinal clearance between the body structure and portions of the latch arm 26 opens a path for debris (e.g., dust) to enter the connector 10 and potentially contaminate an optical fiber terminated by the ferrule 12. Such problem is addressed by at least certain embodiments of the present disclosure, as will be described following the description of the (duplex) connector 40 shown in FIGS. 3 and 4.

FIG. 3 is a perspective view of the duplex fiber optic connector 40, which includes two of the simplex fiber optic connectors 10 according to FIG. 1 as sub-assemblies thereof. For convenience, the term "fiber optic connector elements" (or "connector elements" or "fiber optic connector sub-assemblies") will be used to refer to the connectors 10 when discussing these elements in connection with the connector 40. Indeed, in alternative embodiments, connector 40 may include connector elements that are not similar to simplex fiber optic connectors in all respects.

Still referring to FIG. 3, proximal portions of the fiber optic connector elements 10 in the connector 40 are separated by a lateral gap 42. Rear portions of each connector element 10 are received within a shell 44 that surrounds an internal housing 46 that supports each connector element 10. The shell 44 includes a front end 48 defining a generally rectangular opening that receives rear portions of the connector elements 10. The shell 44 also includes a rear end 50 having a narrowed width in comparison to the front end 48. An outer boot 60 is arranged proximate to the rear end 50 of the shell 44, and may be fitted over a portion of the internal housing 46. A trigger 52 extends outwardly and forwardly (e.g., in a slanted direction relative to) the shell 44 above a recess 58, with a front end 54 of the trigger 52 extending over distal ends 30 of the latch arms 26 of the fiber optic connector elements 10. In operation, a user may press the trigger 52 (e.g., at a finger receiving area 56) in a direction toward the shell 44 to cause the distal ends 30 of the latch arms 26 to move toward the respective connector bodies 18, thereby operating the latch arms 26 to permit disengagement of the connector elements 10 from another structure, such as a dust cap (e.g., as shown in FIG. 4).

FIG. 4 illustrates the duplex fiber optic connector 40 of FIG. 3 following addition of a conventional dust cap 62 over a front end of the connector 40. The dust cap 62 includes a top wall 64, a bottom wall (not shown), and side walls 68, 70, with the side walls 68, 70 extending between a front end 72 and a rear end 74 of the dust cap 62, and with the top wall 64 extending between the front end 72 and an intermediate portion 76. Since the intermediate portion 76 is positioned generally between the front end 72 and the rear end 74 of the dust cap 62, the side walls 68, 70 have a greater length than the top wall 64. An extension member 78 extends rearward from a central portion of the intermediate portion 76 to associate a locking tab 80 with the top wall 64. The locking tab 80 includes a greater width than the extension member 78 to permit the locking tab 80 to cooperate with the cantilever latch tabs 32 of the latch arms 26 so as to retain the dust cap 62 over the front end of the connector 40. The dust cap 62 will be retained in such position until the latch arms 26 are pressed downward toward the connector bodies 18 (e.g., by depressing the trigger 52, which overlaps the distal ends 30 of the latch arms 26), which would cause the cantilever latch tabs 32 to be moved downward and not impede forward movement of the locking tab 80, thereby permitting the dust cap 62 to be removed in a forward direction. As shown in FIG. 4, a longitudinal clearance 82 is provided between cantilever latch tabs 32 and the locking tab 80, which permits slight movement of the dust cap 62 in a forward-rearward direction ("float"), as depicted by the double-ended arrow superimposed over the extension member 78 and the locking tab 80. Such longitudinal clearance 82 (also called "longitudinal float") accommodates displacement in a longitudinal direction without impeding movement of the associated latch arms 26 while the dust cap 62 is mated with the connector 40.

Having described the connector 10 shown in FIG. 1, the connector 40 shown in FIGS. 3 and 4, and the dust cap 62 shown in FIG. 4 for comparison purposes, fiber optic assemblies having body structures with at least one cavity in which at least one fiber optic connector can be retained will now be described. The body structures may include (but are not limited to) dust caps, adapters, patch panels, or fiber optic modules. The connectors are retained using retaining members that cooperate with the body structures.

Figure 5:
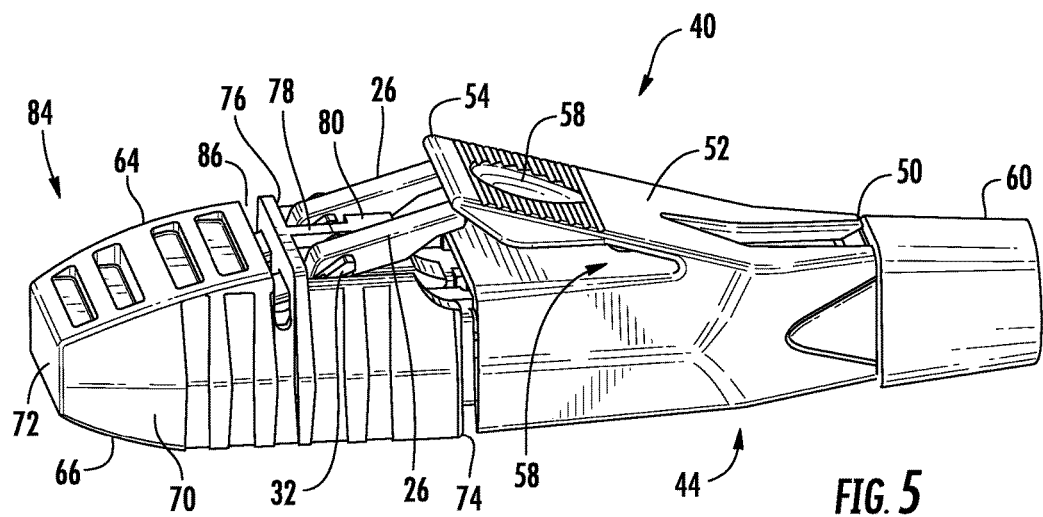
FIG. 5 is a perspective view of the duplex fiber optic connector of FIGS. 3 and 4 following addition of a modified dust cap defining a slot extending through side walls of the dust cap to form a subassembly suitable for receiving at least one pin section of a retaining member (not shown) according to one embodiment.

FIG. 5 shows an exemplary body structure embodied in a dust cap 84 defining a single slot 86 that is suitable for receiving at least one pin section of a retaining member. Such figure illustrates the duplex fiber optic connector 40 of FIGS. 3 and 4 mated with the dust cap 84. A magnified side elevation view of an upper portion of the dust cap 84 and the connector 40 is provided in FIG. 6. Referring to FIG. 5, the dust cap 84 is similar to the dust cap 62 (shown in FIG. 4) in that the dust cap 84 includes a top wall 64, a bottom wall 66, and side walls (including side wall 70), with the side walls (e.g., 70) and the bottom wall 66 extending between a front end 72 and a rear end 74 of the dust cap 84, and with the top wall 64 extending between the front end 72 and an intermediate portion 76 of the dust cap 84. The side walls (e.g., 70) and the bottom wall 66 are longer than the top wall 64. An extension member 78 extends rearward from a central portion of the intermediate portion 76 to associate a locking tab 80 with the top wall 64, wherein the locking tab 80 may be configured to cooperate with cantilever latch tabs 32 of the latch arms 26.

Figure 6:
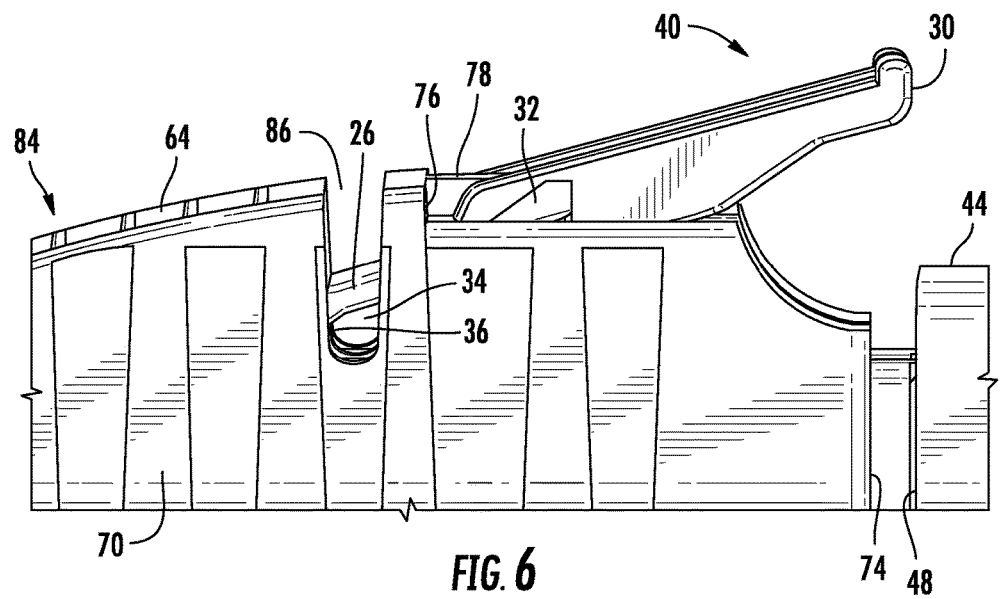
FIG. 6 is a magnified side elevation view of an upper portion of the subassembly shown in FIG. 5.

Unlike the dust cap 62, and now referring to FIGS. 5 and 6, the dust cap 84 includes an opening in the form of a single slot 86, which is defined through the side walls (e.g., 70) as well as through an upper portion of the top wall 64. As shown, the slot 86 extends downward relative to the top wall 64 by a distance of less than or equal to about one fourth of the height of the corresponding side wall 70; however, one or more slots or other forms of openings of any suitable dimensions may be provided. For example, a first slot may be defined through a portion of a first side wall, a second slot may be defined through a portion of a second side wall, and a laterally extending aperture may be defined generally below a top wall to connect the first and second slots, as an alternative to defining a single continuous slot extending through the top wall 64 and between first and second side walls (e.g., 70). When a front portion of the connector 40 is inserted into the dust cap 84, a portion of each latch arm 26 extends past the slot 86, with the slot 86 being of sufficient depth to permit the slot 86 to further expose a forward end portion of the space 34 between the latch arm 26 and the associated connector body 18 proximate to a limit surface 36. If at least one pin section of a retaining member (not shown) is inserted into the slot 86 and into the space 34 behind the limit surface 36, then such insertion will prevent separation between the connector 40 and the dust cap 84, effectively locking the connector 40 and the dust cap 84 together and preventing significant relative movement (e.g., the float illustrated by the double-ended arrow superimposed over the extension member 78 in FIG. 4) until the retaining member is removed.

Retaining members of various sizes, shapes, materials, and conformations may be used with fiber optic assemblies disclosed herein. Certain exemplary retaining members may include a single pin section configured to extend through and beyond one or more side walls (and, therefore, into the cavity or cavities of the body structure) as well as across at least a majority of a width of a fiber optic connector or of a combined width of a laterally ganged group of fiber optic connectors. Alternatively, an exemplary retaining member may include a first pin section configured to extend through and beyond the thickness of a first side wall, and a second pin section configured to extend through and beyond the thickness of a second side wall, with the first and second pin sections being connected by an intermediate section of which at least a portion is configured to be positioned outside the body structure when the retaining member is received by the body structure. In certain embodiments, at least a portion of (or the entirety of) a retaining member may be embodied in a continuous wire clip, such as may be fabricated of spring steel, aluminum, non-ferrous metals, metal alloys, or other materials. In certain embodiments, a retaining member may be fabricated of a molded material (e.g., a polymer, a fiber-reinforced polymer, or a composite material), and may be configured for one-time use.

Figure 7:
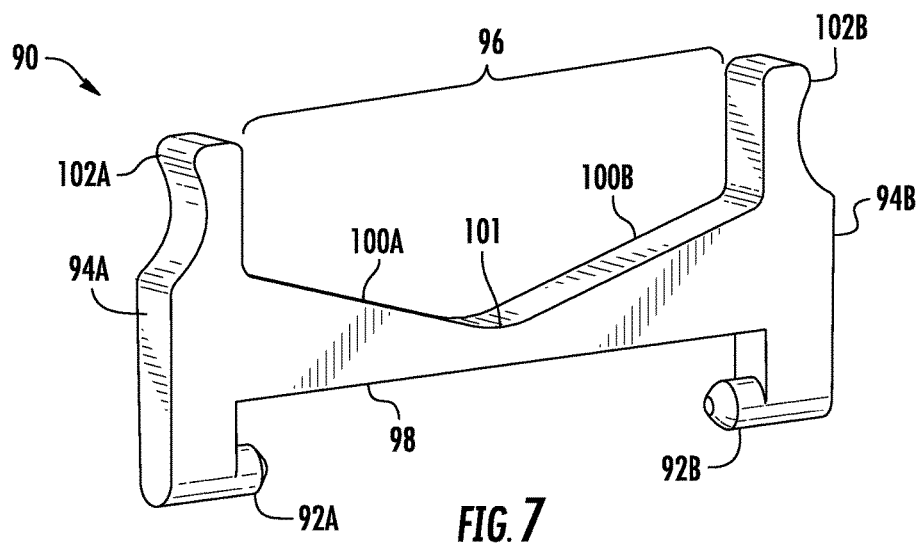
FIG. 7 is a perspective view of a retaining member including inwardly-protruding first and second pin sections arranged below an intermediate section having a minimum thickness medial region, with the retaining member being suitable for use with the subassembly of FIGS. 5 and 6.

FIG. 7 illustrates a first exemplary retaining member 90 suitable for use with the dust cap 84 and duplex fiber optic connector 40 shown in FIGS. 5 and 6. The retaining member 90 includes opposing first and second pin sections 92A, 92B that are coaxially aligned and extend inward relative to arms 94A, 94B of the retaining member 90 that extend in a generally vertical direction. The pin sections 92A, 92B are supported at lower ends of the arms 94A, 94B and are positioned below an intermediate section 96 that spans between the arms 94A, 94B. The intermediate section 96 includes a straight lower edge 98 and downwardly-tapered upper edges 100A, 100B that meet at a minimum thickness region 101 corresponding to the midpoint of the intermediate section 96. First and second tabs 102A, 102B extend upward from the arms 94A, 94B and are configured to be grasped by a user (e.g., between a thumb and forefinger) and squeezed toward one another to cause the intermediate section 96 to bend at the minimum thickness region 101. Such movement serves to alter (i.e., expand) spacing between the first and second pin sections 92A, 92B, and thereby permit removal of the retaining member 90 from a body structure (e.g., the dust cap 84 of FIGS. 5 and 6) in which the retaining member 90 is received. In certain embodiments, the retaining member 90 may be fabricated of one or more plastics or polymer-containing materials by molding, and may be affixed to a dust cap immediately after placement over a pre-cleaned fiber optic connector (not shown). The retaining member 90 may be configured for one-time use (e.g., with bending of the intermediate section 96 causing permanent deformation of the intermediate section 96) to help a user or technician identify a "clean" state of a fiber optic connector if the retaining element 90 is present in an undeformed state over a dust cap affixed to such a fiber optic connector.

Figure 8:
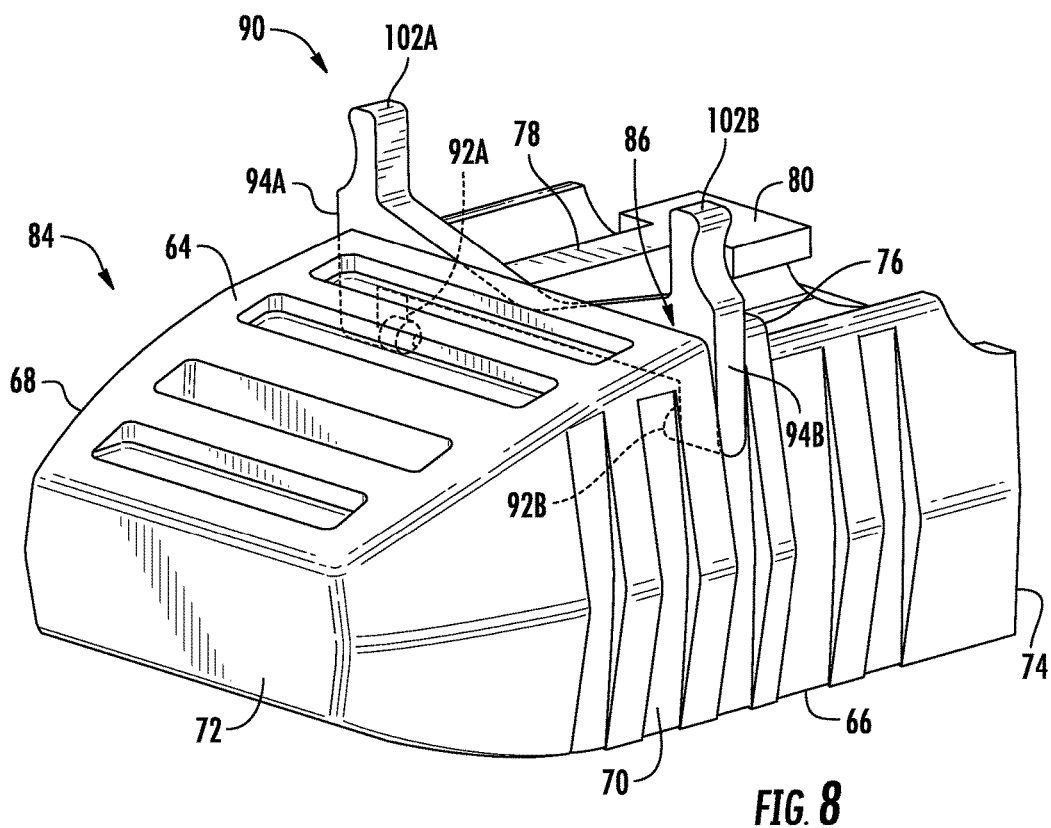
FIG. 8 is a perspective view of the retaining member of FIG. 7 received within the slot of the dust cap shown in FIGS. 5 and 6.

FIG. 8 is a perspective view of the retaining member 90 of FIG. 7 received within the slot 86 of the dust cap 84 shown in FIGS. 5 and 6. As shown, the first and second tabs 102A, 102B extend upward relative to a top wall 64 of the dust cap 84, and the arms 94A, 94B do not extend a significant distance outward relative to side walls 68, 70 of the dust cap 84. Additionally, each of the first pin section 92A and the second pin section 92B includes a length that exceeds a thickness of the corresponding side walls 68, 70 to permit the pin sections 92A, 92B to extend past the respective side walls 68, 70 into an interior of the dust cap 84.

Figure 9:
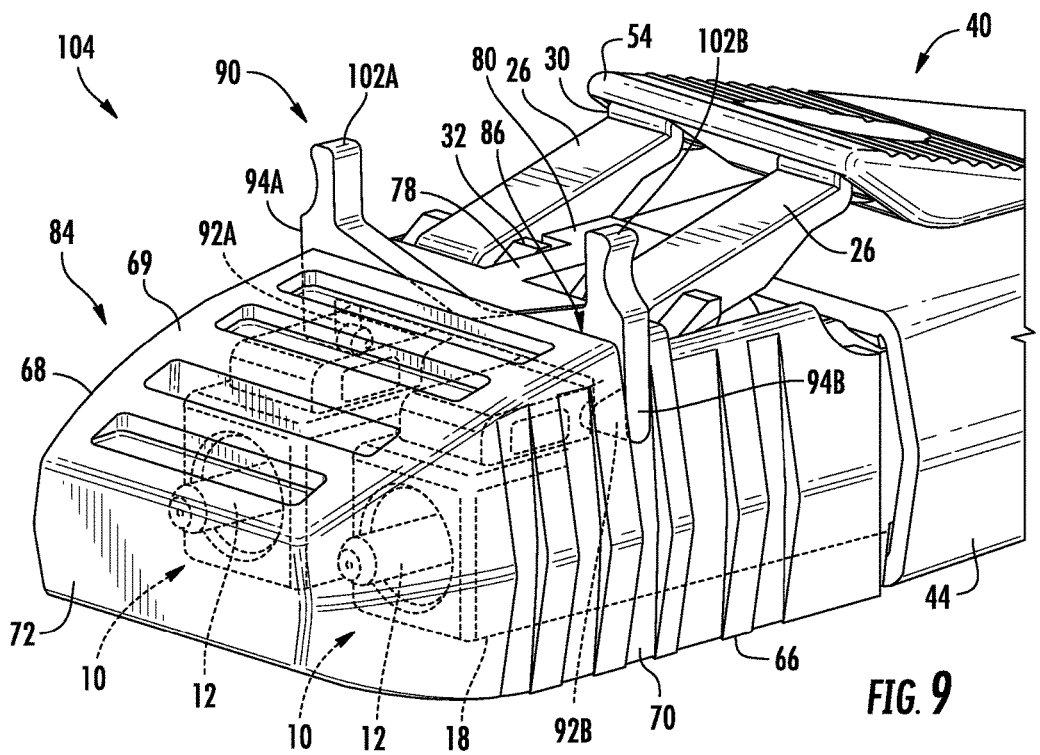
FIG. 9 is a perspective view of a fiber optic assembly according to one embodiment, including the duplex fiber optic connector and dust cap of FIGS. 5 and 6, with the retaining member of FIGS. 7 and 8 received within the slot of the dust cap, and with pin sections of the retaining member further extending into spaces between the latch arms and connector bodies of the connector elements to retain the duplex fiber optic connector within the dust cap.

FIG. 9 illustrates a fiber optic assembly 104 including the dust cap 84 of FIGS. 5 and 6 arranged over a front portion of the connector 40 of FIG. 5, with the retaining member 90 of FIGS. 7 and 8 received within the slot 86 of the dust cap 84. FIG. 9 further illustrates certain portions of the connector 40 arranged within the dust cap 84 (e.g., the connector elements 10 including the connector bodies 18 and ferrules 12) and certain portions of the retaining member 90 (e.g., the pin sections 92A, 92B) in dashed lines to show positioning of these elements relative to the dust cap 84 and relative to one another. As shown in FIG. 9, the pin sections 92A, 92B extend past the side walls 68, 70 to cooperate with features (e.g., proximal ends of the latch arms 26) to retain the connector 40 within the dust cap 84. Compared to the dust cap 62, which relies solely on cooperative engagement between the locking tab 80 and the cantilever latch tabs 32 (as described previously herein) to retain the connector 40 within the dust cap 62, the dust cap 84 retains the connector 40 using the retaining member 90 and thereby exhibits reduction (or elimination) of longitudinal clearance therebetween. The resulting tighter fit between the connector 40 and the dust cap 84 beneficially reduces the ingress of debris (e.g., dust) into an interior of the dust cap 84 containing the connector 40.

Figure 10:
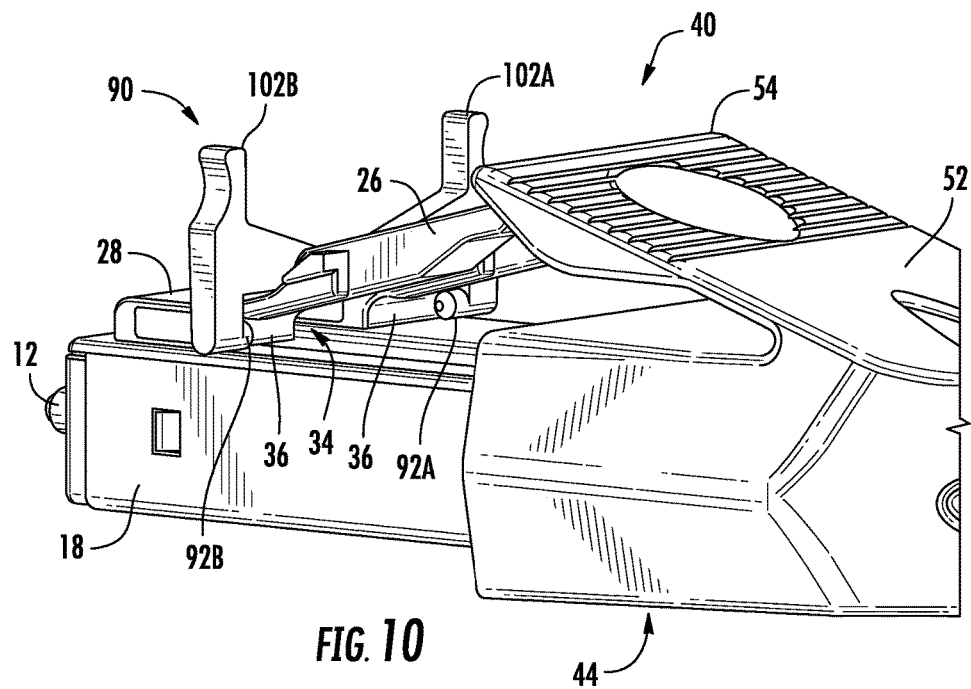
FIG. 10 is a perspective view of a portion of the fiber optic assembly of FIG. 9, showing pin sections of the retaining member extending into the spaces between the latch arms and the connector bodies, but without showing the dust cap.

FIG. 10 shows the retaining member 90 of FIGS. 7-9 and the duplex fiber optic connector 40 of FIG. 3, with the pin sections 92A, 92B of the retaining member 90 extending into spaces 34 between the latch arms 26 and the connector bodies 18 proximate to (i.e., against) limit surfaces 36, which are located rearward of proximal ends 28 of the latch arms 26. The dust cap 84 shown in FIG. 9 is omitted to more clearly depict positioning of the pin sections 92A, 92B relative to the latch arms 26 and the limit surfaces 36. As shown, the trigger 52 and the latch arms 26 in contact therewith are in a substantially relaxed position, without being depressed downward toward the connector body 18. Although a dust cap is omitted from FIG. 10 to promote clarity of illustration, in practice, a portion of the connector 40 would be received in a dust cap (such as the dust cap 84 shown in FIG. 9) before addition of the retaining member 90.

Figure 11:
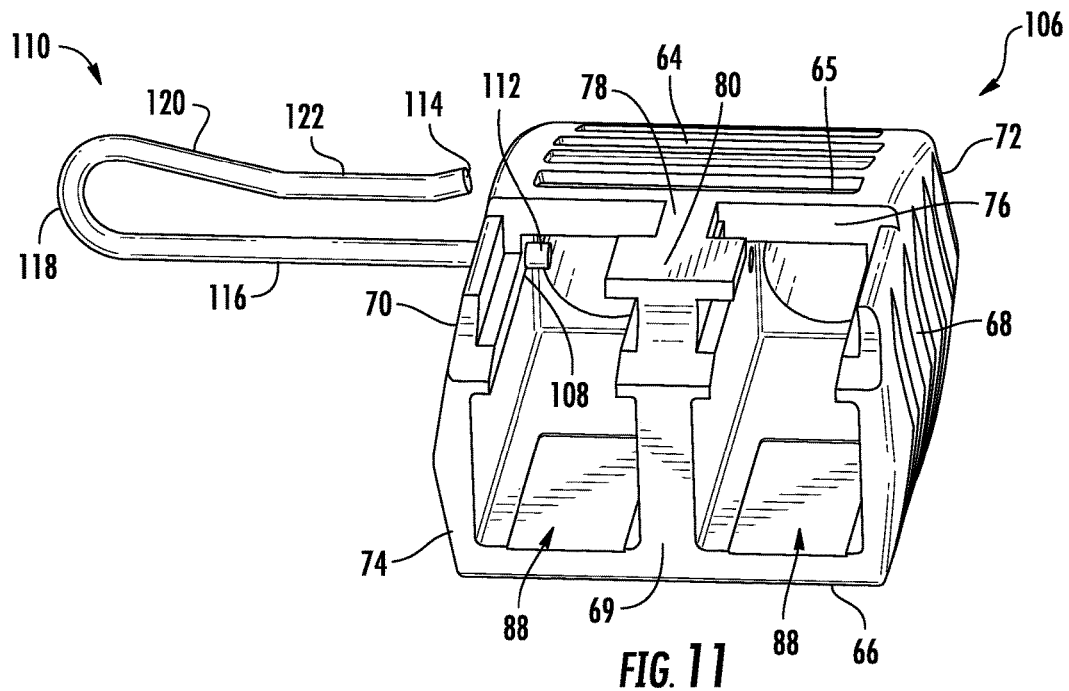
FIG. 11 is a perspective view of a retaining member embodied in a hairpin-shaped continuous wire clip including a portion of a pin section received within an opening defined in a side wall of an alternative dust cap that defines two cavities suitable for receiving a duplex fiber optic connector, according to another embodiment.

FIG. 11 illustrates a retaining member 110 embodied in a hairpin-shaped continuous wire clip including a portion of a first pin section 116 received within an opening 108 defined in a side wall 70 of a dust cap 106 according to another embodiment. The dust cap 106 defines two cavities 88 suitable for receiving a duplex fiber optic connector (e.g., the connector 40 according to FIG. 3). The dust cap 106 is similar to the dust cap 84 described in connection with FIGS. 5, 8, and 9, except that at least one side wall 68, 70 of the dust cap 106 defines the opening 108 as a hole instead of a slot for receiving the retaining member 110. In particular, the dust cap 106 includes a top wall 64, a bottom wall 66, and side walls 68-70, which include an intermediate side wall 69 extending between the cavities 88. The side walls 68-70 and the bottom wall 66 extend between a front end 72 and a rear end 74 of the dust cap 84, and the top wall 64 extends between the front end 72 and an intermediate portion 76 of the dust cap 84. In this regard, the top wall 64 is shorter in length than the side walls 68-70 and the bottom wall 66. An extension member 78 extends rearward from a central portion of the intermediate portion 76 to associate a locking tab 80 with the top wall 64. At least a portion of each cavity 88 is bounded by the top wall 64, the bottom wall 66, and two of the three side walls 68-70. In certain embodiments, at least two side walls (e.g., side wall 68 and intermediate side wall 69, or intermediate side wall 69 and side wall 70) or all three side walls 68-70 define openings 108 therein for receiving the first pin section 116 of the retaining member 110. The retaining member 110 includes a first end 112, a second end 114, and the first pin section 116 extending between the first end 112 and a recurved section 118. The retaining member 110 further includes an inwardly sloping pin section 120, and a gripping pin section 122 that may be arranged substantially parallel to the first pin section 116. To retain a portion of a fiber optic connector (such as the connector 40 shown in FIG. 12) in the dust cap 106, the retaining member 110 may be slid laterally to cause the first pin section 116 to pass through the side wall 70, the intermediate side wall 69, and preferably at least a portion of the remaining side wall 68, thereby causing the gripping pin section 122 to be received within a recess 65 defined in the top wall 64.

Figure 12:
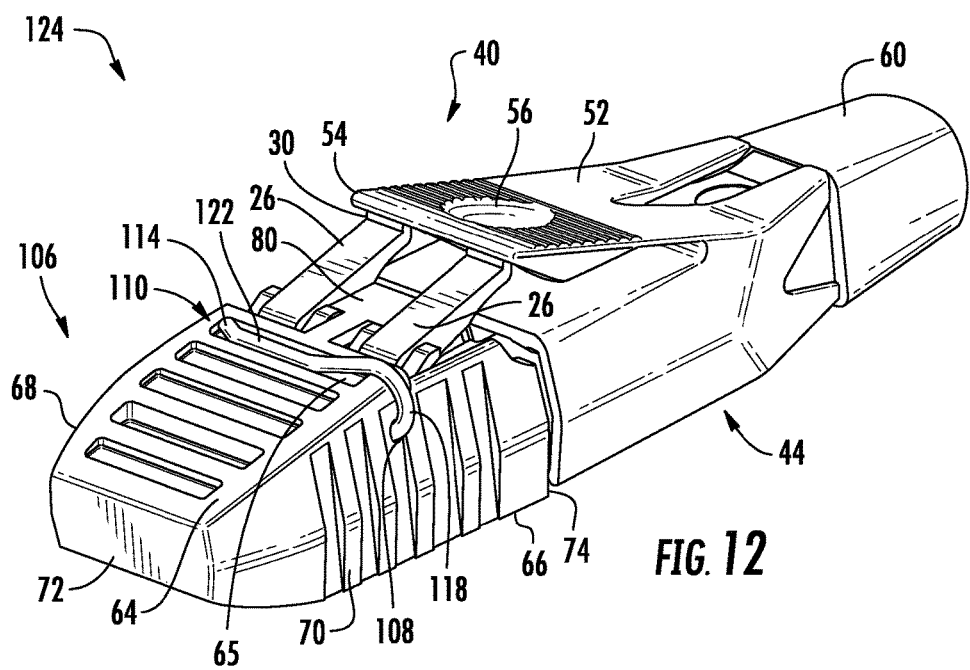
FIG. 12 is a perspective view of a fiber optic assembly according to one embodiment, including the duplex fiber optic connector of FIG. 3 received within cavities of the dust cap of FIG. 11, with the pin section of the retaining member of FIG. 11 inserted through openings in side walls of the dust cap and extending through spaces between the latch arms and the connector bodies to retain the duplex fiber optic connector within the dust cap.

FIG. 12 is a perspective view of a fiber optic assembly 124 including the connector 40 of FIG. 3 received within cavities 88 of the dust cap 106 of FIG. 11, and including the retaining member 110 of FIG. 11 positioned to retain the connector 40 within the dust cap 106. As shown, when the retaining member 110 is fully inserted into the dust cap 106, the gripping pin section 122 is received within a recess 65 defined in the top wall 64. The first pin section 116 (shown in FIG. 11) of the retaining member 110 extends through the opening 108 in side wall 70 and through spaces between the latch arms 26 and the connector bodies (i.e., connector bodies 18 shown in FIG. 3) of the connector 40 to retain the connector 40 within the dust cap 106. A trigger 52 and latch arms 26 in contact therewith are in a substantially relaxed position, without being pressed downward. The remaining elements of the dust cap 106 and the retaining member 110 are the same as described in connection with FIG. 11.

Figure 13:
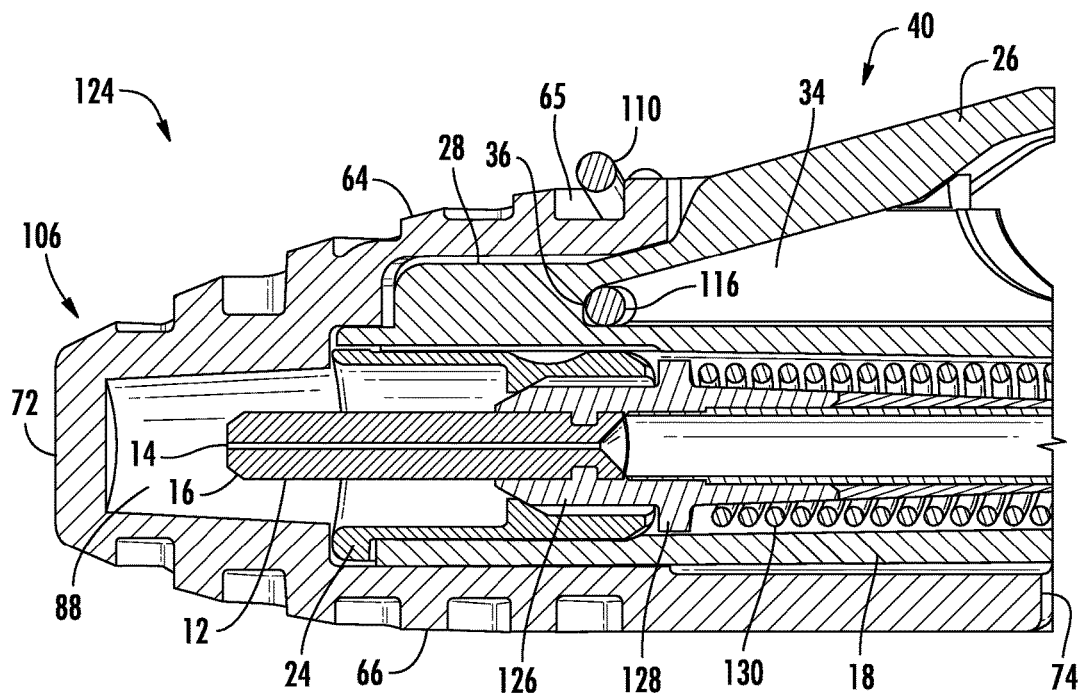
FIG. 13 is a side cross-sectional view of a forward portion of the fiber optic assembly of FIG. 12.

FIG. 13 is a side cross-sectional view of a forward portion of the fiber optic assembly 124 of FIG. 12, showing a front portion of the connector 40 retained within a cavity 88 of the dust cap 106. More specifically, a front portion of one of the connector elements 10 of connector 40 is shown in FIG. 13, although it will be appreciated that the other connector element 10 of connector 40 is retained within the associated cavity 88 in a similar manner. Accordingly, it will be appreciated that the description of FIG. 13 that follows applies equally to the connector element 10 of the connector 40 and the associated cavity 88 of the dust cap 106 that are not shown.

At least a portion of the cavity 88 includes a generally tubular (e.g., cylindrical) shape, and is bounded by the front end 72, the top wall 64 and the bottom wall 66 of the dust cap 106. With respect to the connector element 10, it can be seen how the ferrule 12 extends through the cap 24, and how the connector element 10 includes a ferrule holder 126 arranged between the cap 24 and the ferrule 12. As shown, the bore 14 of the ferrule 12 extends to the front end 16 thereof for receiving an optical fiber. The ferrule holder 126 includes a tapered outer surface 128 that receives a coil spring 130 configured to bias the ferrule 12 in a forward position relative to the connector body 18. The retaining member 110 extends laterally through portions of the dust cap 106 and the connector element 10, with a pin section 116 extending into a space 34 between the latch arm 26 and the connector body 18 to abut the limit surface 36, which is positioned just behind the proximal end 28 of the latch arm 26. Such positioning of the retaining member 110 with respect to both connector elements 10 causes the connector 40 to be held tightly in the dust cap 106, thereby reducing the likelihood of passage of debris (e.g., dust) into the cavity 88 to contaminate the front end 16 of the ferrules 12. In certain embodiments, the retaining member 110 may be difficult to reinstall into a fiber optic connector/dust cap combination following removal thereof, such that removal of the retaining member 110 may serve as an indicator of first use of the connector 40.

In certain embodiments, sealing between a fiber optic connector and a dust cap may be augmented by use of a gasket arranged between (i) a surface of the fiber optic connector proximate to a ferrule and (ii) a surface of the dust cap. In certain embodiments, a gasket may be pre-installed in a dust cap, and a forward-facing surface of a fiber optic connector may be arranged to compress the gasket when a portion of the fiber optic connector is received within a cavity of the dust cap, and such compressive state may be maintained when a retaining member is received by the fiber optic connector and the dust cap.

Figure 14:
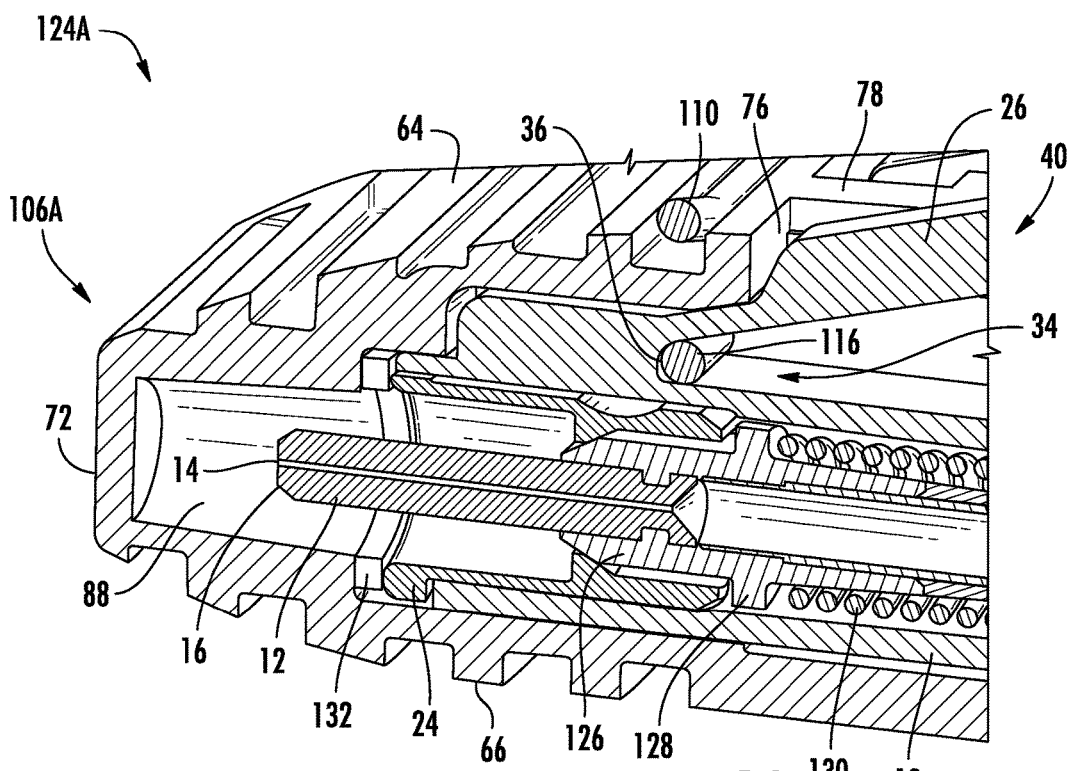
FIG. 14 is a perspective cross-sectional view of an alternative fiber optic assembly that is similar to the assembly of FIGS. 12 and 13, but includes a gasket arranged between a forward-facing surface of a fiber optic connector proximate to a ferrule and a corresponding rearward-facing surface of a dust cap.

FIG. 14 is a perspective cross-sectional view of a fiber optic assembly 124A that is similar to the fiber optic assembly 124 of FIGS. 12 and 13, but includes a gasket 132 arranged between a forward-facing surface of one of the connector elements 10 proximate to the ferrule 12 and a corresponding rearward-facing surface of a dust cap 106A. Again, although only one of the connector elements 10 of connector 40 is shown in FIG. 14, it will be appreciated that the description of FIG. 14 applies equally to the connector element 10 of the connector 40 and the associated cavity 88 of the dust cap 106A that are not shown.

The dust cap 106A of FIG. 14 is nearly identical to the dust cap 106 described in connection with FIGS. 11-13, except for slight elongation of the walls (e.g., walls 64, 66) to accommodate the thickness of the gasket 132. The gasket 132 may be formed of a compressible and/or pliable material, such as rubber, silicone, synthetic rubber, and/or one or more polymeric materials. A retaining member 110 extends laterally through portions of the dust cap 106A and the connector element 10, with a pin section 116 extending into a space 34 between the latch arm 26 and the connector body 18 to abut the limit surface 36, which is positioned just behind the proximal end 28 of the latch arm 26. Such positioning of the retaining member 110 with respect to both connector elements 10 causes the connector 40 to be held tightly in the dust cap 106A with the gasket 132 in a compressed state between adjacent surfaces, so that the likelihood of passage of debris (e.g., dust) into the cavities 88 is further reduced, thereby further avoiding contamination of the front ends 16 of the ferrules 12. The remaining elements of the fiber optic assembly 124A are the same as described in connection with the fiber optic assembly 124 of FIGS. 12 and 13.

Figure 15:
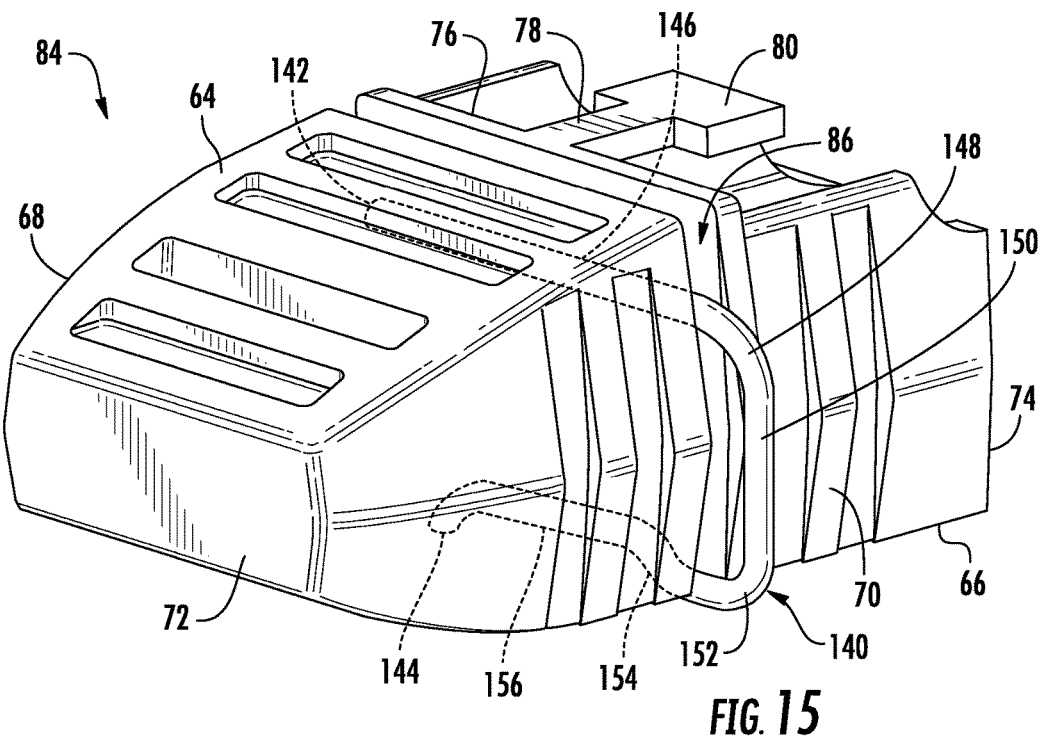
FIG. 15 is a perspective view of a retaining member embodied in a modified U-shaped continuous wire clip including a pin section extending through a slot defined in side walls of a dust cap according to FIGS. 5 and 8, according to another embodiment.

FIG. 15 is a perspective view of a retaining member 140 embodied in a modified U-shaped continuous wire clip for use with the dust cap 84 disclosed in FIGS. 5 and 8, according to another embodiment. The retaining member 140 includes a first pin section 146 extending through the slot 86 defined in the side walls 68, 70 of the dust cap 84. The retaining member 140 also includes a first end 142, a second end 144, a vertical pin section 150, a sloping pin section 154, and a gripping pin section 156. The first pin section 146 extends between the first end 142 and a first bend 148. The vertical pin section 150 extends between the first bend 148 and a second bend 152. The sloping pin section 154 extends between the second bend 152 and the gripping pin section 156, which terminates at the second end 144. In use, the first pin section 146 is configured to be received within the slot 86, while the vertical pin section 150, the sloping pin section 154, and the gripping pin section 156 are configured to be external to the dust cap 84. Although a fiber optic connector is omitted from FIG. 15 to promote clarity of illustration, in practice, a portion of a fiber optic connector (such as the connector 40 shown in FIG. 16) would be received in the dust cap 84 before addition of the retaining member 140.

Figure 16:
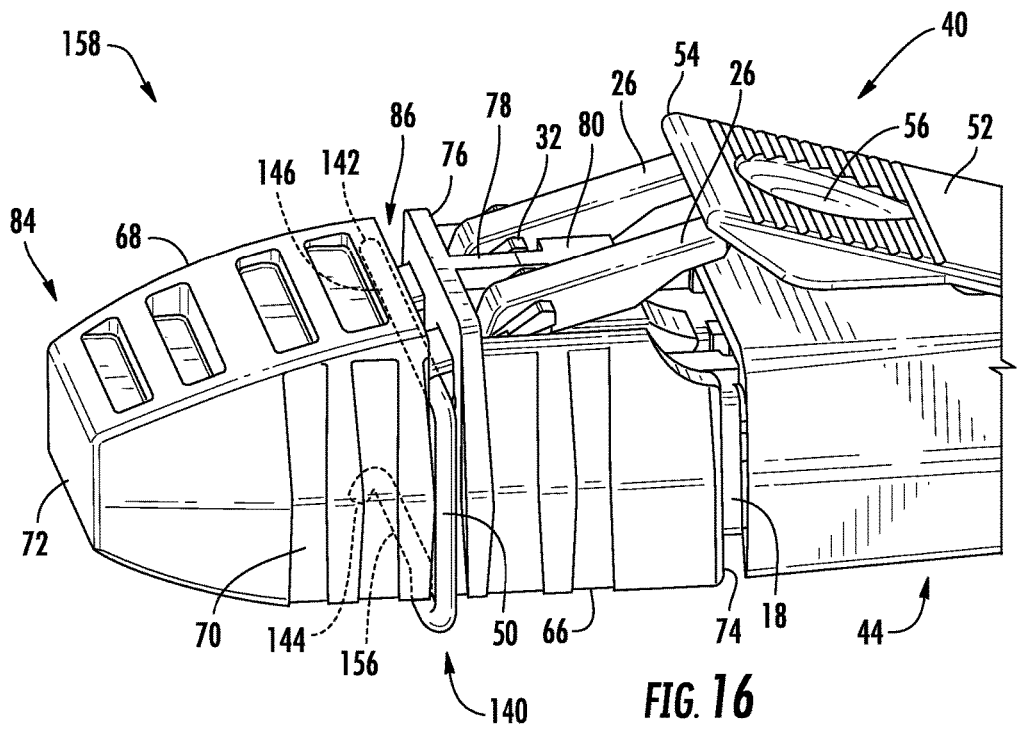
FIG. 16 is a perspective view of a fiber optic assembly according to one embodiment, including the duplex fiber optic connector of FIG. 3 received within cavities of the dust cap of FIGS. 5, 8, and 15, and with the pin section of the retaining member of FIG. 15 inserted through the slot defined in side walls of the dust cap and extending through spaces between the latch arms and the connector bodies to retain the duplex fiber optic connector within the dust cap.

FIG. 16 is a perspective view of a fiber optic assembly 158 according to one embodiment, including the connector 40 of FIG. 3 received within cavities of the dust cap 84 according to FIGS. 5, 8, and 15, and with the retaining member 140 of FIG. 15 positioned to retain the connector 40 within the dust cap 84. Specifically, the first pin section 146 extends into the slot 86 through and beyond the side wall 70 to pass under portions of the latch arms 26 (i.e., between the latch arms 26 and the connector bodies 18 shown in FIG. 3), thereby preventing removal of the connector 40 from the dust cap 84. As shown, when the retaining member 140 is fully inserted through the slot 86 into the dust cap 84, the gripping pin section 156 is received by the bottom wall 66 (e.g., within a recess thereof), and the vertical pin section 150 extends past a portion of the side wall 70 of the dust cap 84 toward the bottom wall 66. With reference to the connector 40, a trigger 52 and the latch arms 26 in contact therewith are in a substantially relaxed position, without being pressed downward.

In certain embodiments, a retaining member may include at least one eccentric feature that permits rotation of the retaining member to bias a fiber optic connector into a forward position within a cavity of a body structure such as a dust cap. In one example, a retaining member may include substantially co-linearly arranged first and second segments of at least one pin section joined by an intermediate segment that defines the eccentric feature. An eccentric feature may be embodied in an arc, a bend, or another non-radially-symmetric feature. In certain embodiments, an eccentric feature may include a substantially constant cross-sectional diameter (or width) relative to a remainder of a retaining member; alternatively, an eccentric feature may include a greater cross-sectional diameter or width than a remainder of a retaining member. A retaining member including at least one eccentric feature may include a continuous wire clip in which each eccentric feature includes a wire bend. In certain embodiments, the pin section of a retaining member including the eccentric feature may be inserted into an opening (e.g., a hole or a slot) of at least one side wall of a body structure including a cavity receiving a fiber optic connector, with the pin section extending through the opening and beyond a wall thickness of the at least one side wall, to cause the pin section to cooperate with at least one feature of the fiber optic connector to retain the fiber optic connector within the cavity. Such insertion may be accomplished when the pin section is in a first rotational position, and thereafter the pin section may be rotated to a second rotational position (e.g., approximately 90 degrees relative to the first rotational position) to cause the eccentric feature to exert a biasing force that urges the fiber optic connector further forward within the cavity of the body structure. In certain embodiments, the body structure may define multiple cavities configured to receive multiple fiber optic connectors, a single retaining member may include multiple eccentric features, and rotation of the retaining member may cause the multiple eccentric features to simultaneously exert biasing forces that urge each fiber optic connector forward within the multiple cavities of the body structure.

Figure 17:
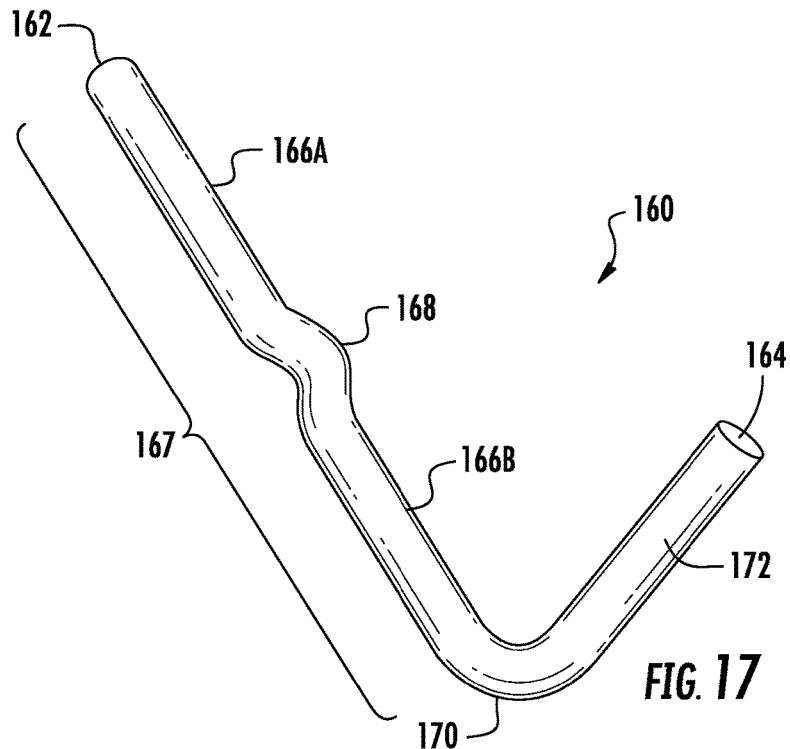
FIG. 17 is a perspective view of a retaining member embodied in a substantially L-shaped continuous wire clip including a first pin section defining two segments having central axes that are substantially co-linear in orientation, with the two segments being connected by an arc-shaped intermediate segment, and including a second pin section arranged substantially perpendicular to the segments of the first pin section.

FIG. 17 is a perspective view of a retaining member 160 embodied in a substantially L-shaped continuous wire clip including an arc or bend 168 (e.g., "arc-shaped intermediate segment") arranged between two co-linear segments 166A, 166B, with the arc or bend 168 serving as an eccentric feature. The retaining member 160 includes a first end 162 and a second end 164. In combination, the segments 166A, 166B and the arc or bend 168 comprise a first pin section 167. One segment 166A extends from the first end 162 to the arc or bend 168, another segment 166B extends from the arc or bend 168 to a perpendicular bend 170, and a second pin section 172 extends from the perpendicular bend 170 to the second end 164. As shown, the arc or bend 168 and the segments 166A, 166B each include substantially the same cross-sectional diameter.

Figure 18:
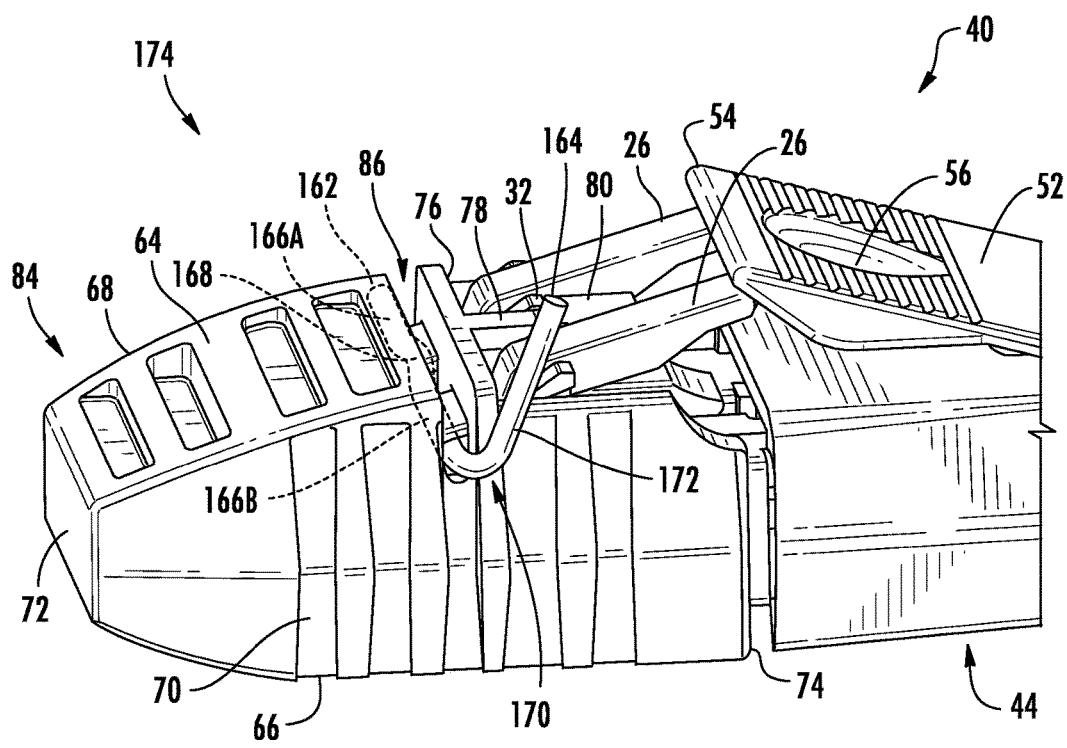
FIG. 18 is a perspective view of a fiber optic assembly according to one embodiment, including the duplex fiber optic connector of FIG. 3 received within cavities of the dust cap of FIG. 15, and with the retaining member of FIG. 17 inserted through the slot defined in portions of side walls and a top wall of the dust cap and extending through spaces between the latch arms and the connector bodies to retain the duplex fiber optic connector within the dust cap.

FIG. 18 is a perspective view of a fiber optic assembly 174 according to one embodiment, including the connector 40 of FIG. 3 received within cavities of the dust cap 84 of FIGS. 5, 8, and 15, and with the retaining member 160 of FIG. 17 inserted through the slot 86 defined in portions of side walls 68, 70 and the top wall 64 of the dust cap 84. Both segments 166A, 166B and the arc or bend 168 extend past one side wall 70, with the segments 166A, 166B extending below portions of the latch arms 26 of the connector 40 to retain the connector 40 within the dust cap 84. As shown, the second pin section 172 of the retaining member 160 is oriented at the one o'clock position, with the arc or bend 168 (embodying an eccentric feature) extending generally upward. In use, the second pin section 172 may be rotated clockwise (e.g., to the three o'clock or four o'clock positions) to cause the arc or bend 168 to extend in a generally rearward direction, thereby causing the arc or bend 168 to exert a biasing force that urges the connector 40 forward within the cavities 88 defined by the dust cap 84. The resulting tighter fit between the connector 40 and the dust cap 84 beneficially reduces the ingress of debris (e.g., dust) into an interior of the dust cap 84 containing the connector 40.

Although various embodiments described previously herein have been directed to body structures in the form of dust caps suitable for receiving fiber optic connectors, it is to be appreciated that body structures of various other types (e.g., adapters, patch panels, fiber optic modules, etc.) may include features for receiving retaining members to promote retention of one or more fiber optic connectors, as described hereinafter. Such retention may be desired to ensure positive engagement of the connector or to prevent accidental/inadvertent removal of the connector from the adapter, module, or other body structure.

Figure 19:
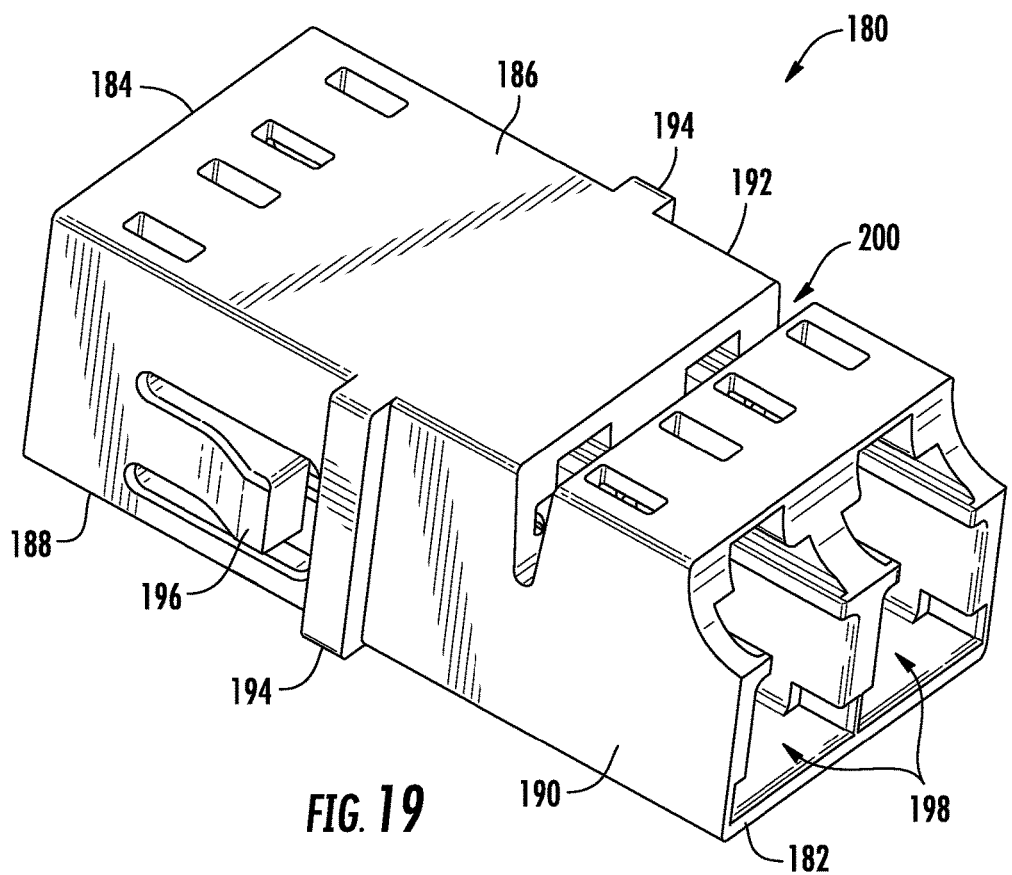
FIG. 19 is a perspective view of a duplex adapter defining two cavities suitable for receiving the duplex fiber optic connector of FIG. 3, and including a slot defined through sidewalls thereof suitable for receiving a retaining member.

FIG. 19 is a perspective view of a duplex adapter 180 configured to be received by an adapter panel (not shown), and including cavities 198 suitable for receiving a duplex fiber optic connector (e.g., connector 40 as described in connection with FIG. 3). The adapter 180 includes a front end 182, an opposing rear end 184, a top wall 186, a bottom wall 188, and side walls 190, 192. Each side wall 190, 192 includes a lateral protrusion 194 and an outwardly biased spring tab 196 that, in combination, serve to retain the adapter 180 within a rectangular aperture (not shown) defined in the adapter panel. An opening in the form of a slot 200 is defined through the top wall 186 as well as through portions of both side walls 190, 192, with the slot 200 being sized and shaped to receive a retaining member (not shown) configured to cooperate with at least one feature of a fiber optic connector (not shown) to retain the fiber optic connector within the cavities 198 of the adapter 180. In certain embodiments, the adapter 180 may be fabricated of polymeric materials using any suitable manufacturing process, such as molding.

Figure 20:
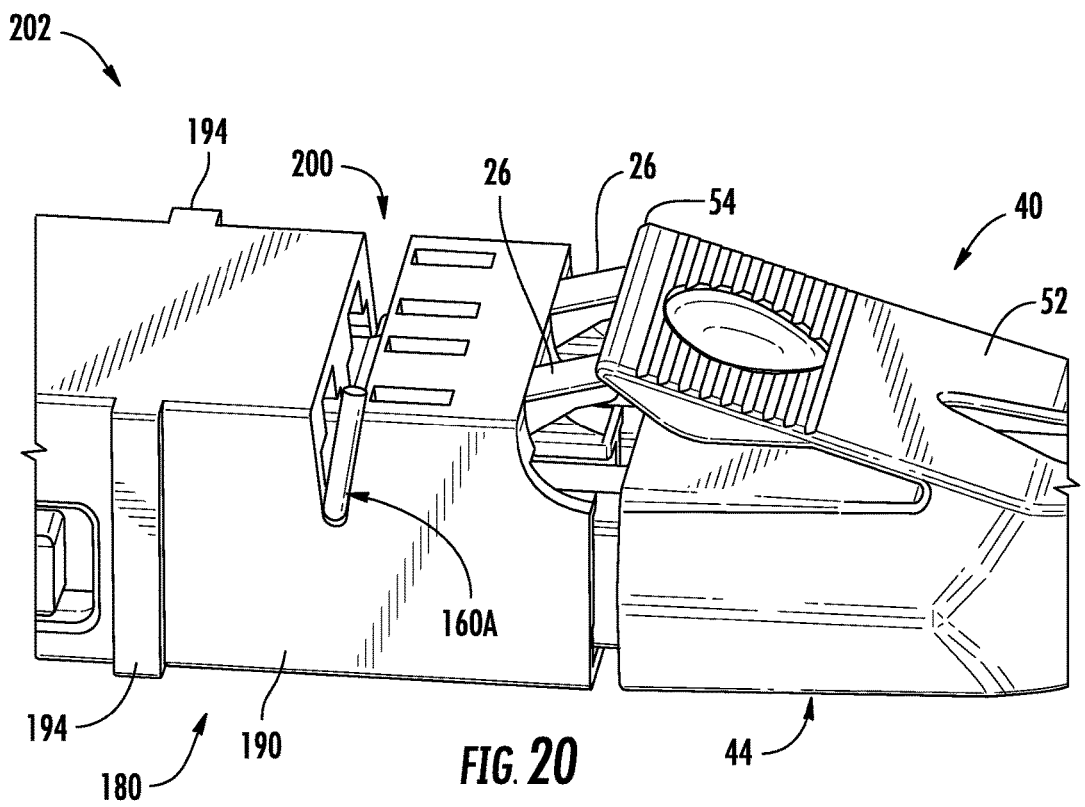
FIG. 20 is a perspective view of a fiber optic assembly according to one embodiment, including the duplex fiber optic connector of FIG. 3 received within cavities of the duplex adapter of FIG. 19, and with a substantially L-shaped retaining member inserted through the slot defined in the side wall of the adapter and extending through spaces between the latch arms and the connector bodies to retain the duplex fiber optic connector within the adapter.

FIG. 20 is a perspective view of a fiber optic assembly 202 according to one embodiment, including the duplex fiber optic connector 40 of FIG. 3 received within cavities 198 (shown in FIG. 19) of the adapter 180 of FIG. 19, and including a substantially L-shaped retaining member 160A arranged to retain the connector 40 within the adapter 180. In particular, a first pin section 167A (shown in FIG. 21) of the retaining member 160A extends past a sidewall 190 within the slot 200 and under portions of the latch arms 26 (e.g., at a position distal from the front end 54 of the trigger 52) of the connector 40. Such positioning of the retaining member 160A serves to retain the connector 40 in a forward position within the adapter 180.

Figure 21:
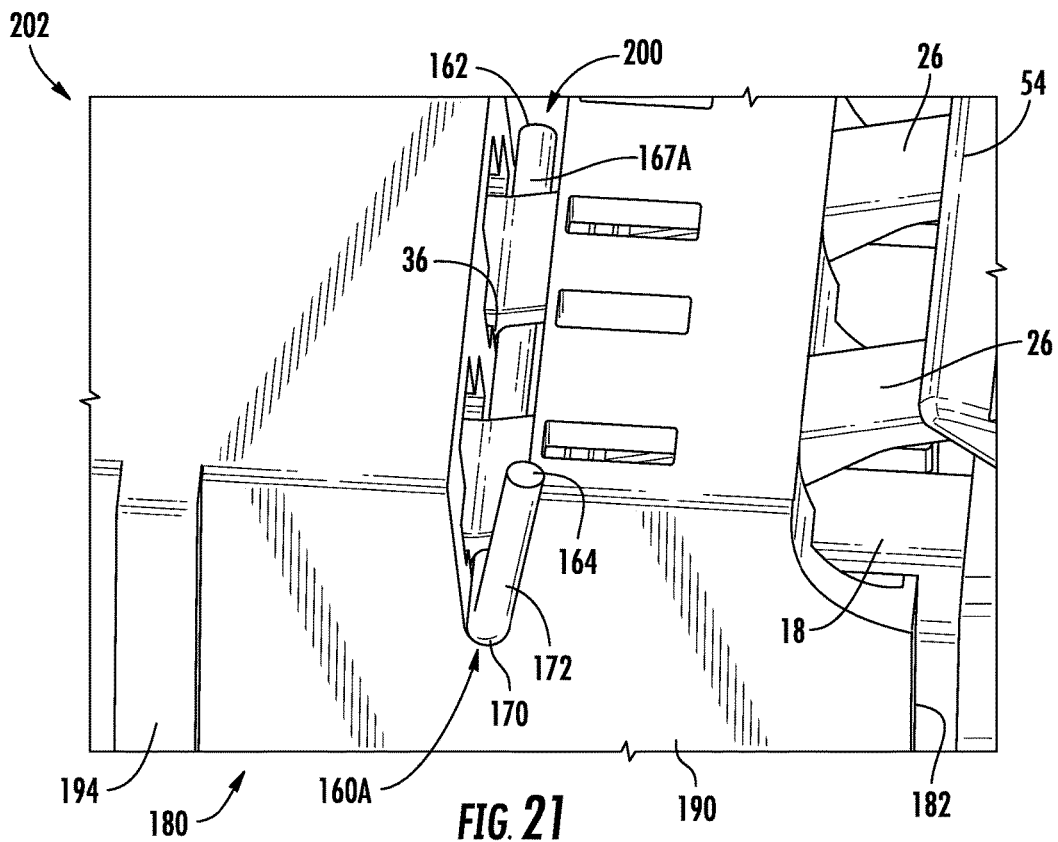
FIG. 21 is a magnified perspective view of an upper portion of the fiber optic assembly of FIG. 20.

FIG. 21 is a magnified perspective view of an upper portion of the fiber optic assembly 202 of FIG. 20. As shown, the retaining member 160A includes a first end 162, a second end 164, and first and second pin sections 167A, 172 meeting at a perpendicular bend 170. As illustrated, the first pin section 167A is substantially horizontal, and the second pin section 172 is substantially vertical. The retaining member 160A is similar to the retaining member 160 of FIG. 17, but lacks an arc or bend 168 serving as an eccentric feature. With continued reference to FIG. 21, the first pin section 167A extends past the first side wall 190 into the slot 200 to extend under portions of the latch arms 26 and above the connector bodies 18, in abutting relationship with limit surfaces 36. Such positioning of the retaining member 160A retains the connector 40 in a forward position within the adapter 180.

Figure 22:
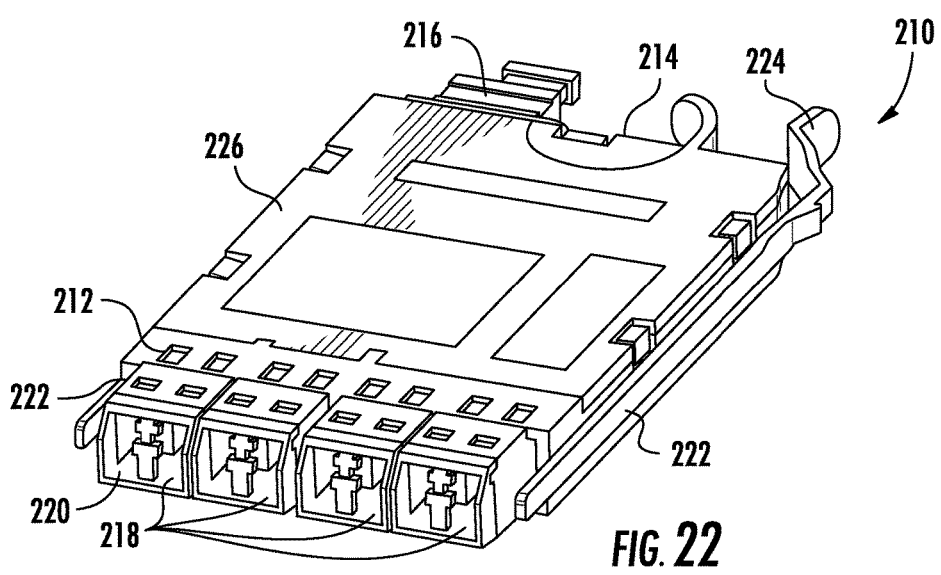
FIG. 22 is an upper perspective view of a fiber optic module including four duplex adapters, with the adapters including front openings suitable for receiving one or more retaining members as disclosed herein within an interior of the fiber optic module.

FIG. 22 illustrates a fiber optic module 210 including a front body portion 212 in which four duplex adapters 218 are received. The fiber optic module 210 includes a generally rectangular main body 214 arranged to receive a removable cover 226 for accessing an interior of the module 210. Longitudinal rails 222 extending along side walls of the fiber optic module 210 permit the module 210 to be received within a slidable fiber optic equipment tray (not shown). A rear latching member 224 extending outward and rearward from one longitudinal rail 222 enables selective retention or release of the module 210 relative to the fiber optic equipment tray. A rear portion of the fiber optic module 210 includes a fiber optic component 216. In this example, the fiber optic component 216 is a multi-fiber fiber optic adapter (e.g., an MPO adapter) that facilitates establishing connections between multiple (e.g., eight or more) optical fibers. The fiber optic module 210 may also manage polarity between the duplex adapters 218 and the fiber optic component 216. Each duplex adapter 218 includes front openings 220 configured to receive a duplex fiber optic connector (not shown). Preferably, each duplex adapter 218 further includes lateral openings (not shown) that may be positioned within an interior of the main body 214 suitable for receiving one or more retaining members as disclosed herein.

Figure 23:
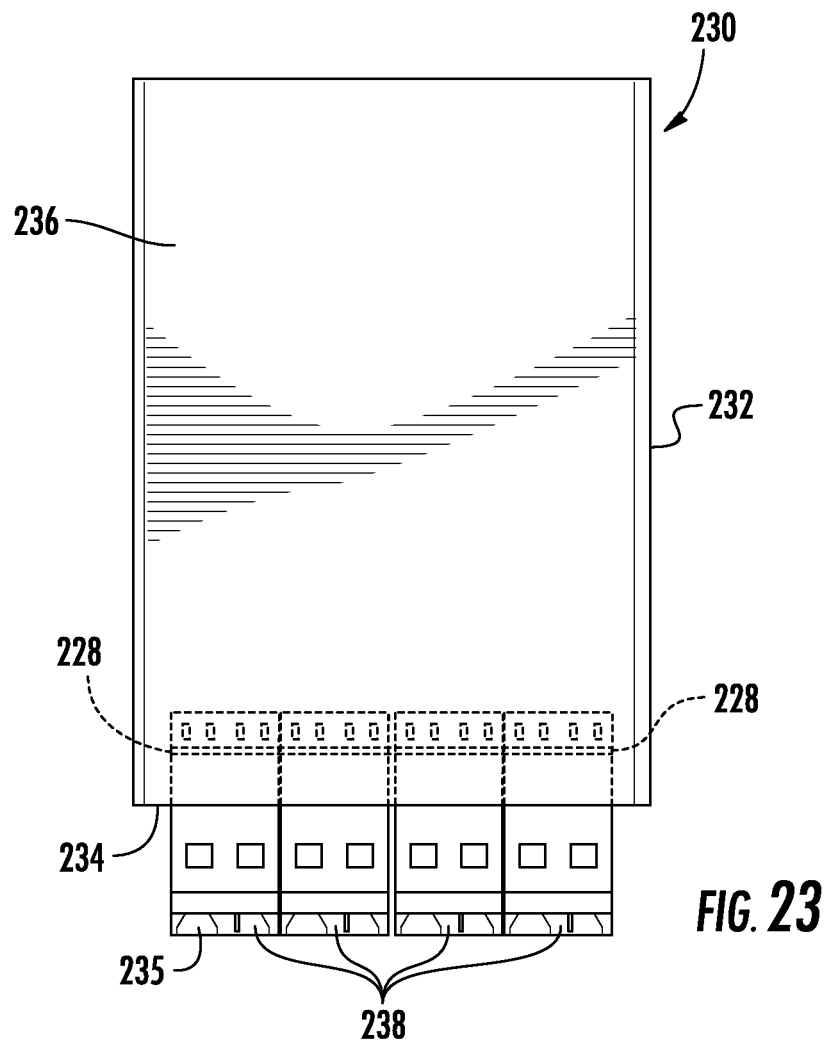
FIG. 23 is a top plan schematic view of a fiber optic module receiving four duplex adapters that may include lateral openings suitable for receiving at least one pin section of one or more retaining members as disclosed herein.

FIG. 23 is a top plan schematic view of a fiber optic module 230 receiving four duplex adapters 238 each including a cavity 235 suitable for receiving a duplex fiber optic connector (not shown, but such as the connector 40 described in connection with FIG. 3). With continued reference to FIG. 23, the duplex adapters 238 include lateral openings 228 arranged to receive at least one pin section of one or more retaining members as disclosed herein (such as the retaining member 240 shown in FIG. 24), in order to retain a fiber optic connector within the cavity 235. A portion of each duplex adapter 238 extends through a front end 234 into an interior 236 of a main body 232 of the fiber optic module 230, such that the lateral openings 228 are arranged within the interior 236 of a main body 232. In certain embodiments, one or more pin sections of a retaining member may be inserted through the lateral openings 228 of the duplex adapters 238 within the interior 236 of the main body 232 prior to placement of a cover (not shown) to close the interior 236. Insertion of one or more pin sections of a retaining member through the lateral openings 228 when fiber optic connectors are received by the duplex adapters 238 promotes retention of the fiber optic connectors within the duplex adapters 238.

Figure 24:
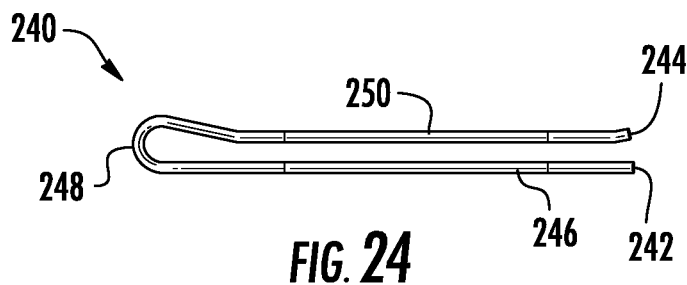
FIG. 24 is a side elevation view of a retaining member embodied in a hairpin-shaped continuous wire clip that may be inserted through the lateral openings of the adapters of FIG. 23 when fiber optic connectors are received in the cavities of the adapters in order to retain the fiber optic connectors within the adapters.

FIG. 24 illustrates a retaining member 240 embodied in a hairpin-shaped continuous wire clip that may be inserted through lateral openings 228 of the duplex adapters 238 of FIG. 23. The retaining member 240 includes a first end 242, a second end 244, a first pin section 246, a second pin section 250, and a recurved section 248. The first pin section 246 extends between the first end 242 and the recurved section 248, and the second pin section 250 extends between the recurved section 248 and the second end 244. At least a portion of the second pin section 250 is substantially parallel to the first pin section 246. The recurved section 248 preferably permits the pin sections 246, 250 to be forcibly separated from one another but exerts a biasing force to seek to maintain a generally parallel orientation between the pin sections 246, 250. In use, when the first pin section 246 is inserted through at least one opening defined in a body structure (not shown), the second pin section 250 may tend to grip an adjacent (e.g., top or bottom) surface of the body structure.

Figure 25:
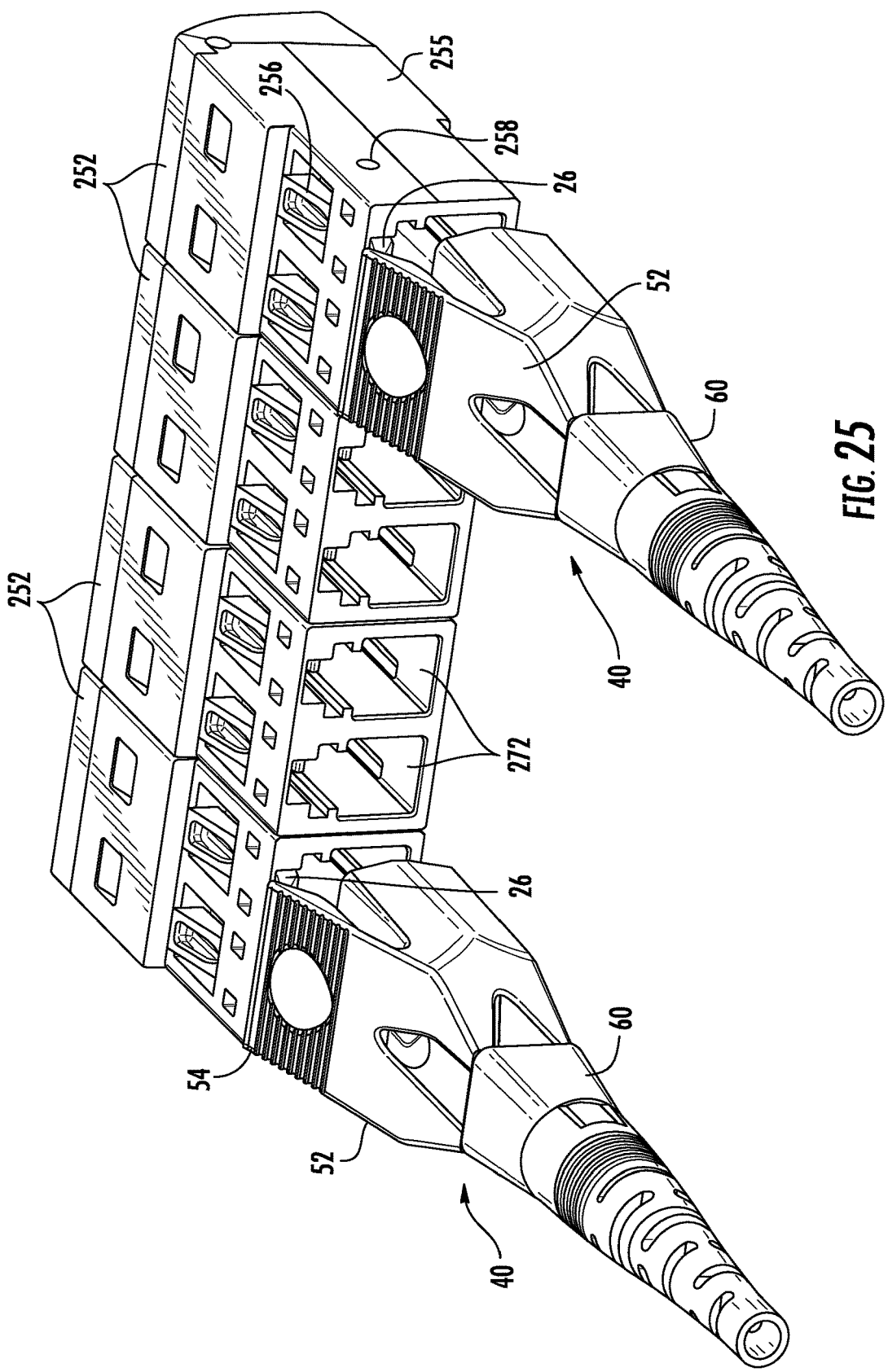
FIG. 25 is a perspective view of a four laterally abutting duplex adapters, with the outermost two adapters each receiving in a cavity thereof the duplex fiber optic connector of FIG. 3.

FIG. 25 is a perspective view of four laterally abutting duplex adapters 252, with the outermost two adapters 252 each receiving in rear cavities 272 thereof a duplex fiber optic connector 40 as disclosed in FIG. 3. Each adapter 252 includes a lateral opening 258 defined through side walls 255 thereof, with the lateral opening 258 being configured to receive a retaining member (such as the retaining member 260 shown in FIG. 26) to retain the connectors 40 in the rear cavities 272 of the adapters 252. Each adapter 252 further includes an upper cantilever tab 256 that may be depressed for selective retention or release of a connector 40, with such selection subject to being overridden if the connector 40 is further retained by a retaining member as disclosed herein. Each connector 40 includes the latch arms 26 with distal ends contacting the front end 54 of the associated trigger 52, and with proximal ends extending into the rear cavities 272 of the adapters 252. The lateral openings 258 are positioned to be aligned with spaces between the latch arms 26 and the connector bodies (not shown) of the connectors 40 when the connectors 40 are received within rear cavities 272 of the adapters 252, so that insertion through the lateral openings 258 of at least one pin section of a retaining member (not shown) will retain the connectors 40 within the rear cavities 272 of the adapters 252.

Figure 26:
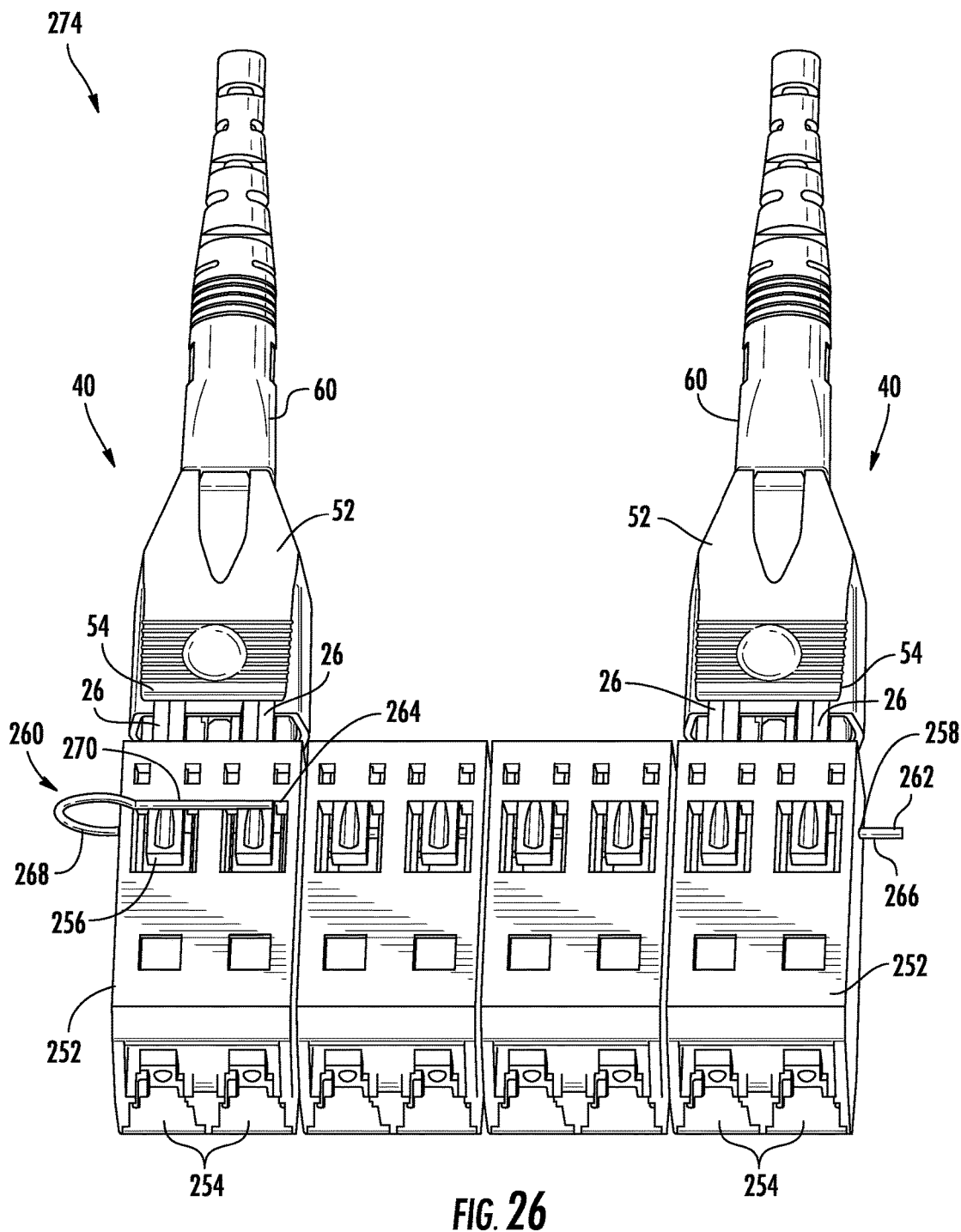
FIG. 26 is a perspective view of a fiber optic assembly according to one embodiment, including the four laterally abutting duplex adapters and two duplex fiber optic connectors of FIG. 25, and including a retaining member embodied in a continuous wire clip with a pin section extending through side wall openings of the adapters and through spaces between the latch arms and the connector bodies of the duplex fiber optic connectors to retain the duplex fiber optic connectors within the adapters.

FIG. 26 illustrates a fiber optic assembly 274 including the four laterally abutting duplex adapters 252 and the two duplex fiber optic connectors 40 of FIG. 25, and including a retaining member 260 embodied in a continuous wire clip serving to retain the fiber optic connectors 40 within respective adapters 252. Each adapter 252 further includes front cavities 254 for receiving additional fiber optic components (such as fiber optic connectors, not shown). The retaining member 260 includes a first end 262, a second end 264, a first pin section 266, a second pin section 270, and a recurved section 268. The first pin section 266 extends between the first end 262 and the recurved section 268, and the second pin section 270 extends between the recurved section 268 and the second end 264. At least a portion of the second pin section 270 is substantially parallel to the first pin section 266. The recurved section 268 preferably exerts a biasing force to seek to maintain a generally parallel orientation between the pin sections 266, 270. As shown, the first pin section 266 extends through lateral openings 258 of the adapters 252, and further extends through spaces between the latch arms 26 and connector bodies (not shown) of the connectors 40, causing the retaining member 260 to retain the connectors 40 within the rear cavities 272 (shown in FIG. 25) of the adapters 252. Although not shown, it is to be appreciated that the adapters 252 and the retaining member 260 may be arranged within a fiber optic module (such as a fiber optic module 230 according to FIG. 23).

Consistent with the foregoing description, a method for forming a fiber optic assembly may include multiple steps. One step includes inserting at least one fiber optic connector into at least one cavity of a body structure, wherein the at least one cavity is defined by a top wall, a bottom wall, and a plurality of side walls of the body structure, and each side wall of the plurality of side walls includes a wall thickness, and at least one side wall of the plurality of side walls defines an opening (e.g., a hole or slot). A subsequent step includes inserting at least one pin section of a retaining member into the opening of the at least one side wall, with the at least one pin section extending through the opening defined in the at least one side wall and extending beyond the wall thickness of the at least one side wall, to cause the at least one pin section to cooperate with at least one feature of the at least one fiber optic connector to retain the at least one fiber optic connector within the at least one cavity. The at least one fiber optic connector may include a ferrule-based connector as disclosed herein. In certain embodiments, an additional step may include arranging a gasket between a surface of the at least one fiber optic connector proximate to a ferrule and a surface of the body structure, prior to insertion of the at least one fiber optic connector into the at least one cavity of the body structure. In certain embodiments, an additional step may include rotation of the retaining member including an eccentric feature after insertion of the retaining member, whereby rotation of the retaining member (which may be embodied in or include a continuous wire clip) causes the eccentric feature to exert a biasing force that urges the at least one fiber optic connector further forward within the at least one cavity of the body structure. In certain embodiments, a plurality of cavities may be arranged to receive a plurality of fiber optic connectors. In such a case, the inserting of at least one fiber optic connector into at least one cavity of a body structure may comprise inserting the plurality of fiber optic connectors into the plurality of cavities, and the inserting of at least one pin section into the opening of the at least one side wall of the plurality of side walls causes the at least one pin section to cooperate with at least one feature of each fiber optic connector of the plurality of fiber optic connectors to retain the plurality of fiber optic connectors within the plurality of cavities.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A fiber optic assembly comprising:
   at least one fiber optic connector configured to receive at least one optical fiber, wherein the at least one fiber optic connector comprises:
      a ferrule configured to support the at least one optical fiber, wherein the ferrule defines a front of the at least one fiber optic connector;
      a connector body surrounding at least a portion of the ferrule; and
      a latch arm extending outwardly and rearwardly from a portion of the connector body, wherein an end of the latch arm can be depressed toward the connector body;
   a body structure comprising a top wall, a bottom wall, and a plurality of side walls defining at least one cavity configured to receive a front portion of the at least one fiber optic connector that includes the portion of the connector body from which that latch arm extends; and a retaining member including at least one pin section;
wherein at least one side wall of the plurality of side walls defines an opening configured to receive the at least one pin section; and
wherein the at least one pin section is configured to extend through the opening defined in the at least one side wall of the plurality of side walls and into the at least one cavity, to permit the at least one pin section to cooperate with the latch arm of the at least one fiber optic connector when the at least one fiber optic connector is received by the at least one cavity to thereby retain the at least one fiber optic connector within the at least one cavity.

2. The fiber optic assembly of claim 1, wherein the opening defined in the at least one side wall comprises a slot defined in the at least one side wall.

3. The fiber optic assembly of claim 1, wherein the opening defined in the at least one side wall comprises a hole defined through the at least one side wall.

4. The fiber optic assembly of claim 1, wherein the body structure comprises a dust cap configured to cover the front portion of the at least one fiber optic connector.

5. The fiber optic assembly of claim 4, further comprising at least one gasket proximate to at least one rearward-facing surface of the dust cap, wherein the at least one rearward-facing surface is located within the at least one cavity.

6. The fiber optic assembly of claim 1, wherein the body structure comprises a fiber optic adapter.

7. The fiber optic assembly of claim 6, wherein:
the at least one fiber optic connector comprises a plurality of fiber optic connectors;
the at least one cavity comprises a plurality of cavities defined by the plurality of side walls of the fiber optic assembly;
multiple side walls of the plurality of side walls define respective openings configured to receive the at least one pin section; and
the at least one pin section is configured to extend through the openings defined in the multiple side walls of the plurality of side walls, to permit the at least one pin section to cooperate with the plurality of fiber optic connectors when the plurality of fiber optic connectors is received by the plurality of cavities to thereby retain the plurality of fiber optic connectors within the plurality of cavities.

8. The fiber optic assembly of claim 1, wherein:
the at least one pin section comprises a first pin section configured to extend through and beyond a first side wall of the plurality of side wads to permit the first pin section to cooperate with the latch arm of the at least one fiber optic connector when the at least one fiber optic connector is received by the at least one cavity to retain the at least one fiber optic connector within the at least one cavity;
the at least one pin section comprises a second pin section configured to extend through and beyond a second side wall of the plurality of side wads to permit the second pin section to cooperate with the latch arm of the at least one fiber optic connector when the at least one fiber optic connector is received by the at least one cavity to retain the at least one fiber optic connector within the at least one cavity; and the retaining member further includes an intermediate section connecting the first pin section and the second pin section, wherein at least a portion of the intermediate section is arranged outside the body structure when the first pin section and the second pin section extend through the first side wall and the second side wall, respectively.

9. The fiber optic assembly of claim 8, wherein the retaining member comprises first and second tabs extending outward relative to the body structure and configured to be grasped by a user to permit the user to alter spacing between the first and second pin sections and permit removal of the retaining member from the body structure.

10. The fiber optic assembly of claim 1, wherein:
the retaining member comprises a continuous wire clip;
a first portion of the continuous wire clip defines the at least one pin section; and
a second portion of the continuous wire clip is arranged outside the body structure when the at least one pin section cooperates with the at least one feature of the at least one fiber optic connector.

11. The fiber optic assembly of claim 10, wherein at least one first segment of the first portion of the continuous wire clip is substantially parallel to at least one second segment of the second portion of the continuous wire clip, and the continuous wire clip is configured to exert a compressive force between the at least one first segment and the at least one second segment with the at least one second segment contacting an external surface of the top wall or the bottom wall of the body structure in order to resist inadvertent removal of the continuous wire clip from the opening defined by the at least one side wall of the body structure.

12. The fiber optic assembly of claim 11, wherein at least one segment of the second portion of the continuous wire clip is arranged substantially perpendicular to at least one segment of the first portion of the continuous wire clip.

13. The fiber optic assembly of claim 10, wherein the at least one pin section comprises two segments having central axes that are substantially co-linear in orientation, and an intermediate segment that connects the two segments, wherein the intermediate segment comprises an eccentric feature.

14. The fiber optic assembly of claim 1, wherein the body structure defines at least one pair of cavities, and cavities of the at least one pair of cavities are arranged side-by-side.

15. A fiber optic assembly comprising:
at least one fiber optic connector configured to receive at least one optical fiber, wherein the at least one fiber optic connector comprises:
a ferrule configured to support the at least one optical fiber, wherein the ferrule defines a front of the at least one fiber optic connector;
a connector body surrounding at least a portion of the ferrule; and
a latch arm extending outwardly and rearwardly from a portion of the connector body, wherein an end of the latch arm can be depressed toward the connector body;
a body structure comprising a top wall, a bottom wall, and a plurality of side walls defining at least one cavity in which a front portion of the at least one fiber optic connector is received, wherein a first side wall of the plurality of side walls defines a first opening and a second side wall of the plurality of side walls defines a second opening; and
a retaining member including at least one pin section, wherein the retaining member is configured to engage the body structure such that the at least one pin section extends (i) through the first opening, (ii) between at least a portion of the latch arm and the connector body, and (iii) through the second opening.

16. The fiber optic assembly of claim 15, wherein the first opening defined in the first side wall comprises a slot defined in the first side wall, and the second opening defined in the second side wall comprises a slot defined in the second side wall.

17. The fiber optic assembly of claim 15, wherein the first opening defined in the first side wall comprises a hole defined through the first side wall, and the second opening defined in the second side wall comprises a hole defined in the second side wall.

18. The fiber optic assembly of claim 15, wherein the body structure comprises a dust cap configured to cover the ferrule of the at least one fiber optic connector.

19. The fiber optic assembly of claim 18, further comprising at least one gasket arranged between a forward-facing surface of the at least one fiber optic connector proximate to the ferrule and a rearward-facing surface of the dust cap, wherein the rearward-facing surface is located within the at least one cavity.

20. The fiber optic assembly of claim 15, wherein the body structure comprises a fiber optic adapter.

21. The fiber optic assembly of claim 20, wherein:
the at least one fiber optic connector comprises a plurality of fiber optic connectors;
the at least one cavity comprises a plurality of cavities configured to receive the plurality of fiber optic connectors;
multiple side walls of the plurality of side walls define respective openings configured to receive the at least one pin section; and
the at least one pin section is configured to extend through the openings defined in the multiple side walls of the plurality of side walls, to permit the at least one pin section to cooperate with at least one feature of each fiber optic connector of the plurality of fiber optic connectors to thereby retain the plurality of fiber optic connectors within the plurality of cavities.

22. The fiber optic assembly of claim 15, wherein:
the at least one pin section comprises a first pin section configured to extend through the first opening in the first side wall of the plurality of side walls to permit the first pin section to cooperate with at least one feature of the at least one fiber optic connector when the at least one fiber optic connector is received by the at least one cavity to retain the at least one fiber optic connector within the at least one cavity;
the at least one pin section comprises a second pin section configured to extend through the second opening in the second side wall of the plurality of side walls to permit the second pin section to cooperate with the at least one feature of the at least one fiber optic connector when the at least one fiber optic connector is received by the at least one cavity to retain the at least one fiber optic connector within the at least one cavity; and
the retaining member further includes an intermediate section connecting the first pin section and the second pin section, wherein at least a portion of the intermediate section is arranged outside the body structure when the first pin section and the second pin section cooperate with the at least one feature of the at least one fiber optic connector.

23. The fiber optic assembly of claim 15, wherein:
the retaining member comprises a continuous wire clip;
a first portion of the continuous wire clip defines the at least one pin section; and
a second portion of the continuous wire clip is arranged outside the body structure when the at least one pin section cooperates with at least one feature of the at least one fiber optic connector.

24. The fiber optic assembly of claim 15, wherein the at least one fiber optic connector comprises at least one duplex fiber optic connector, and the body structure defines at least one pair of cavities configured to receive the at least one duplex fiber optic connector.

25. A method for forming a fiber optic assembly, the method comprising:
inserting at least one fiber optic connector into at least one cavity of a body structure, wherein the at least one cavity is defined by a top wall, a bottom wall, and a plurality of side walls of the body structure, and wherein at least one side wall of the plurality of side walls defines an opening; and
inserting at least one pin section of a retaining member into the opening of the at least one side wall, with the at least one pin section extending through the opening and into the at least one cavity, to cause the at least one pin section to cooperate with at least one feature of the at least one fiber optic connector to retain the at least one fiber optic connector within the at least one cavity;
wherein:
the at least one fiber optic connector comprises: (i) a ferrule configured to support at least one optical fiber, wherein the ferrule defines a front of the at least one fiber optic connector, (ii) a connector body surrounding at least a portion of the ferrule; and (iii) a latch arm extending outwardly and rearwardly from a portion of the connector body, wherein an end of the latch arm can be depressed toward the connector body; and
the inserting of the at least one pin section of the retaining member into the opening of the at least one side wall causes the at least one pin section to extend into a space between the latch arm and the connector body to cooperate with the latch arm to retain the at least one fiber optic connector within the at least one cavity.

26. The method of claim 25, further comprising:
arranging a gasket between a forward-facing surface of the at least one fiber optic connector and a rearward-facing surface of the body structure, prior to insertion of the at least one fiber optic connector into the at least one cavity of the body structure.

27. The method of claim 26, wherein:
the retaining member comprises a continuous wire clip, a first portion of the continuous wire clip defines the at least one pin section, and a second portion of the continuous wire clip is arranged outside the body structure when the at least one pin section cooperates with the latch arm of the at least one fiber optic connector; and
the method further comprises rotating the second portion of the continuous wire clip to cause the first portion of the continuous wire clip to exert a biasing force that urges the at least one fiber optic connector further forward within the at least one cavity of the body structure.

28. The method of claim 27, wherein:
the first portion of the continuous wire clip includes a first segment, a second segment that is oriented substantially co-linear with the first segment, and an intermediate segment comprising an eccentric feature, with the intermediate segment connecting the first segment and the second segment; and the eccentric feature of the intermediate segment exerts the biasing force that urges the at least one fiber optic connector further forward within the at least one cavity of the body structure, when the second portion of the continuous wire clip is rotated.

29. The method of claim 25, wherein:

the at least one fiber optic connector comprises a plurality of fiber optic connectors;

the at least one cavity comprises a plurality of cavities;

the inserting of the at least one fiber optic connector into the at least one cavity of the body structure comprises inserting of the plurality of fiber optic connectors into the plurality of cavities; and the inserting of the at least one pin section of the retaining member into the opening of the at least one side wall causes the at least one pin section to cooperate with a latch arm of each fiber optic connector of the plurality of fiber optic connectors to retain the plurality of fiber optic connectors within the plurality of cavities.

* * * * *